United States Patent
Kim

(10) Patent No.: US 12,366,687 B2
(45) Date of Patent: Jul. 22, 2025

(54) OPTICAL DEVICE

(71) Applicant: LG INNOTEK CO., LTD., Seoul (KR)

(72) Inventor: Ui Jun Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 538 days.

(21) Appl. No.: 17/774,254

(22) PCT Filed: Nov. 4, 2020

(86) PCT No.: PCT/KR2020/015282
§ 371 (c)(1),
(2) Date: May 4, 2022

(87) PCT Pub. No.: WO2021/091212
PCT Pub. Date: May 14, 2021

(65) Prior Publication Data
US 2022/0390652 A1      Dec. 8, 2022

(30) Foreign Application Priority Data
Nov. 4, 2019  (KR) .................. 10-2019-0139571

(51) Int. Cl.
*G02B 3/14* (2006.01)
*G02B 7/02* (2021.01)
(Continued)

(52) U.S. Cl.
CPC .............. *G02B 3/14* (2013.01); *G02B 7/028* (2013.01); *G02B 7/09* (2013.01); *G02B 26/005* (2013.01)

(58) Field of Classification Search
CPC ...... G02B 27/646; G02B 6/3514; G02B 7/08; G02B 7/09; G02B 7/182; G02B 15/173; G02B 15/14; G02B 15/177; G02B 15/22; G02B 15/16; G02B 13/18; G02B 13/009; G02B 27/64; G02B 13/02; G02B 7/04;
(Continued)

(56) References Cited

U.S. PATENT DOCUMENTS 7,612,947 B2 * 11/2009 Helwegen ................ G02B 7/36
                                                                       359/698
2008/0062529 A1   3/2008 Helwegen et al.
(Continued)

FOREIGN PATENT DOCUMENTS

| JP | 2008-515021 A | 5/2008 |
|----|---------------|--------|
| JP | 2011-530722 A | 12/2011 |
| KR | 10-2018-0087082 A | 8/2018 |

*Primary Examiner* — Stephone B Allen
*Assistant Examiner* — Tamara Y. Washington
(74) *Attorney, Agent, or Firm* — Birch, Stewart, Kolasch & Birch, LLP

(57) ABSTRACT

An embodiment provides an optical device comprising: a lens assembly which includes a liquid lens comprising a first liquid and a second liquid forming an interface therebetween; a temperature sensor which senses the temperature of the liquid lens; and a controller which controls a driving signal for the liquid lens, wherein the controller controls the driving signal by using a first function when the sensed temperature is in a first temperature range and by using a second function different from the first function when the sensed temperature is in a second temperature range.

9 Claims, 23 Drawing Sheets

(51) Int. Cl.
*G02B 7/09* (2021.01)
*G02B 26/00* (2006.01)

(58) Field of Classification Search
CPC ...... G02B 13/0015; G02B 15/15; G02B 13/0045; G02B 15/17; G02B 15/20; G02B 27/0025; G02B 9/62; G02B 13/04; G02B 7/023; G02B 9/64; G02B 13/001; G02B 13/0065; G02B 15/10; G02B 15/163; G02B 15/167; G02B 23/02; G02B 7/02; G02B 7/022; G02B 7/102; G02B 7/14; G02B 9/04; G02B 9/34; G02B 9/60; G02B 13/002; G02B 13/004; G02B 13/06; G02B 13/16; G02B 15/12; G02B 15/161; G02B 17/08; G02B 17/0804; G02B 17/0808; G02B 17/0896; G02B 21/26; G02B 23/08; G02B 26/004; G02B 26/0808; G02B 26/0816; G02B 27/0911; G02B 27/644; G02B 3/14; G02B 7/021; G02B 7/025; G02B 7/028; G02B 7/18; G02B 7/24; G02B 7/28; G02B 9/00; G02B 9/24; G02B 26/005; G03B 5/00; G03B 3/00; G03B 3/14; G03B 5/02; G03B 5/06; G03B 2205/0015; G03B 3/10; G03B 2205/0069; G03B 2205/002; G03B 2205/0007; G03B 13/36; G03B 17/02; G03B 17/04; G03B 17/14; G03B 17/12; G03B 2205/0046; G03B 2205/0053; G03B 2205/0092
See application file for complete search history.

(56) References Cited

U.S. PATENT DOCUMENTS

| | | |
|---|---|---|
| 2008/0277480 A1 | 11/2008 | Thuries et al. |
| 2011/0200314 A1* | 8/2011 | Kawashima ............ G02B 3/14 396/89 |
| 2018/0136372 A1 | 5/2018 | Patscheider et al. |
| 2019/0377236 A1 | 12/2019 | Jang et al. |

* cited by examiner

[FIG.1]
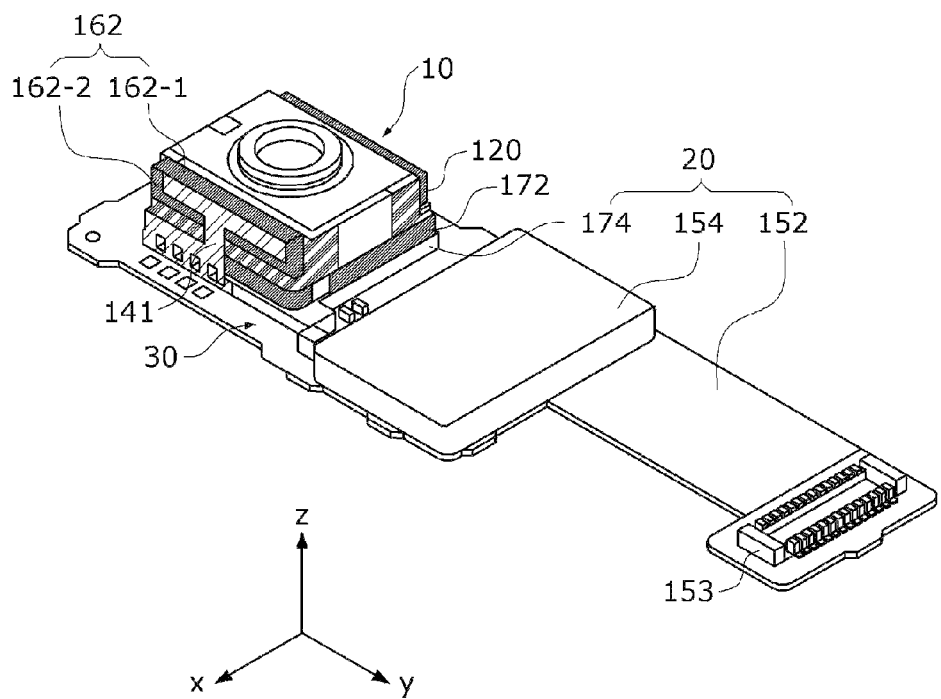

[FIG.2]
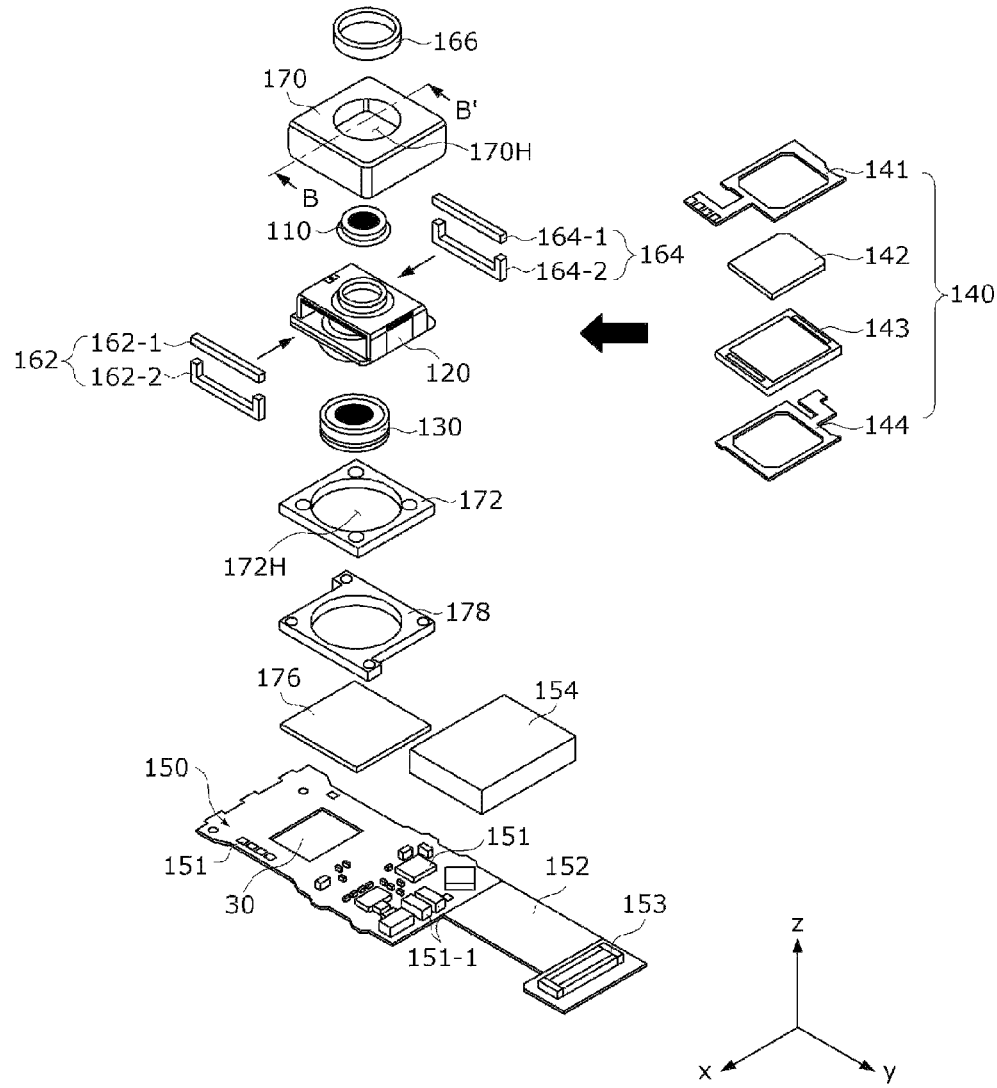

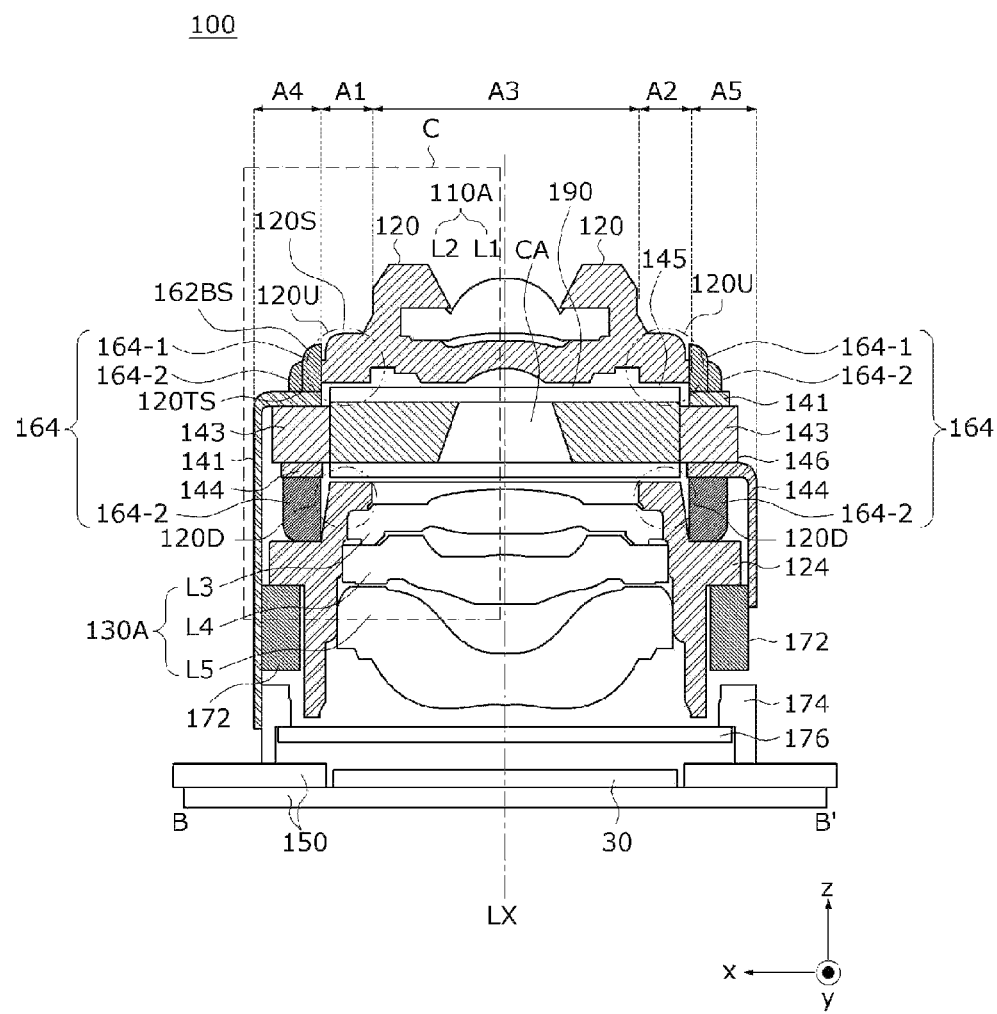
[FIG.3]

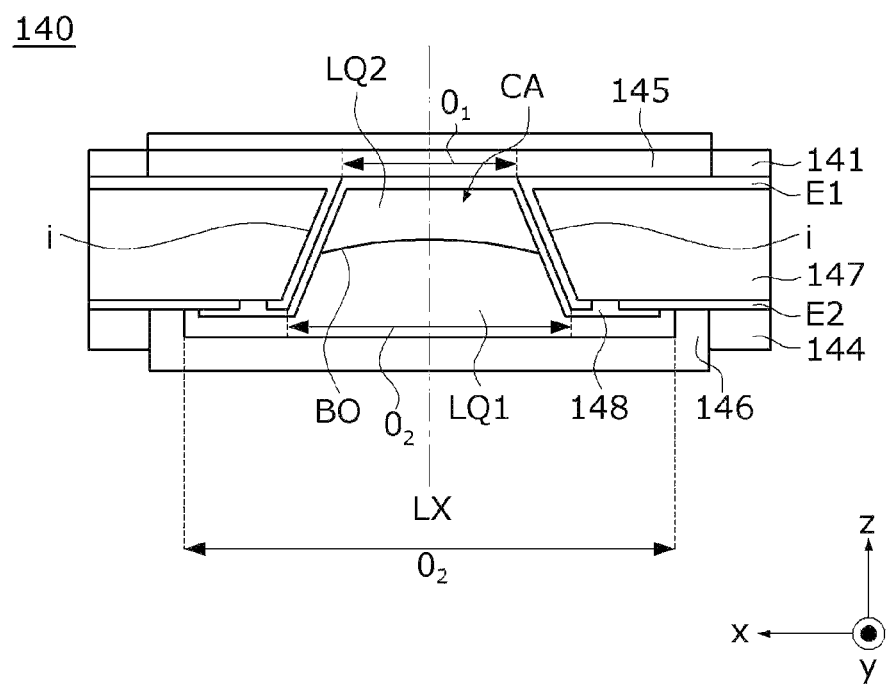

[FIG.5a]
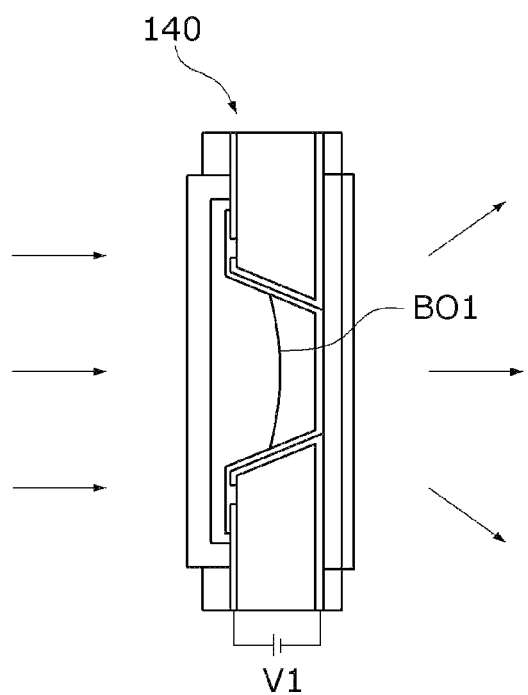

【FIG.5b】
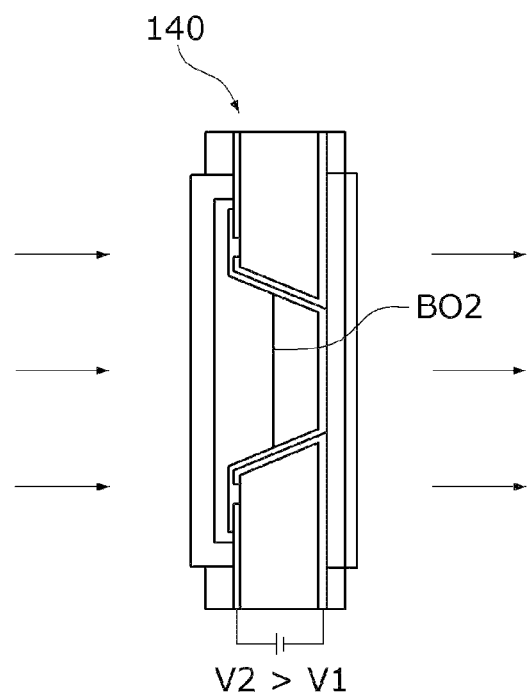

【FIG.5c】
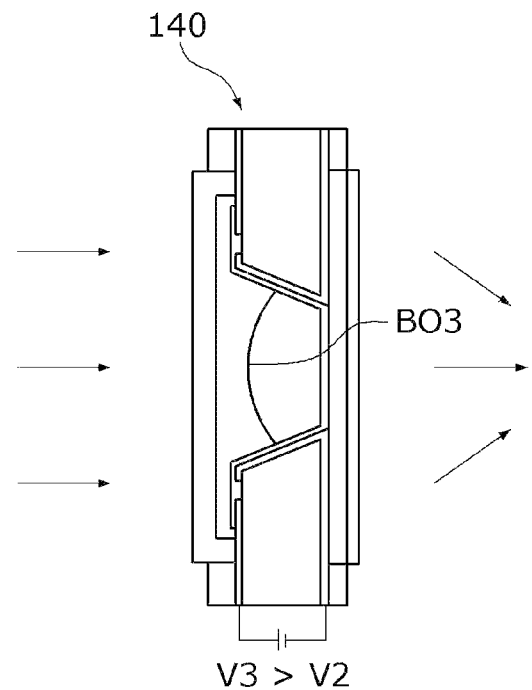
【FIG.5d】
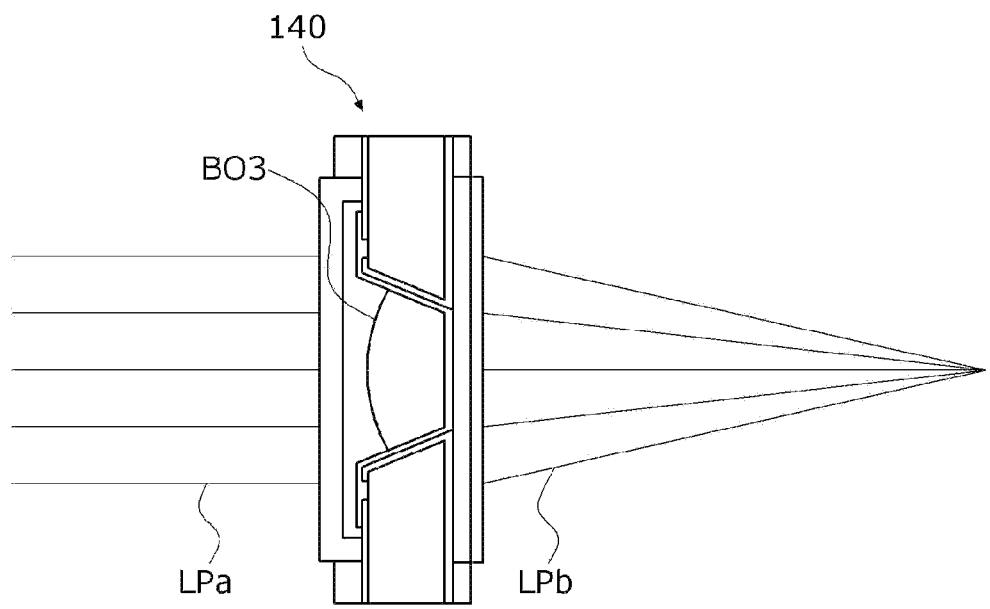

[FIG.5e]
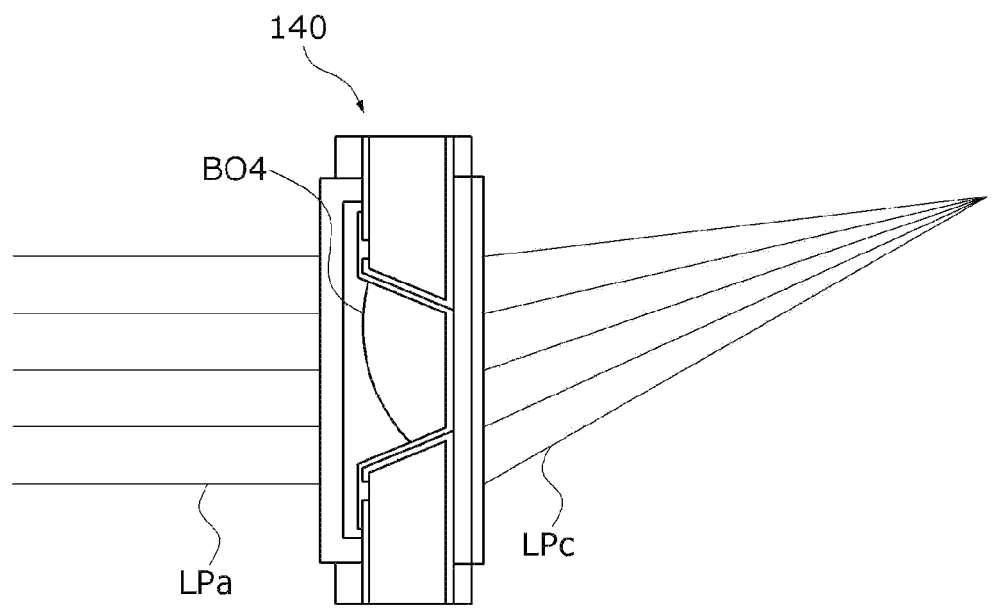
[FIG.6]
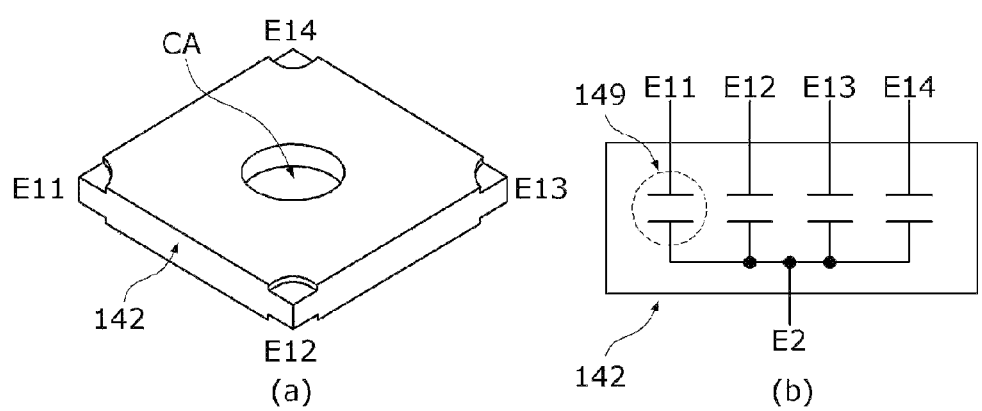

[FIG.7a]
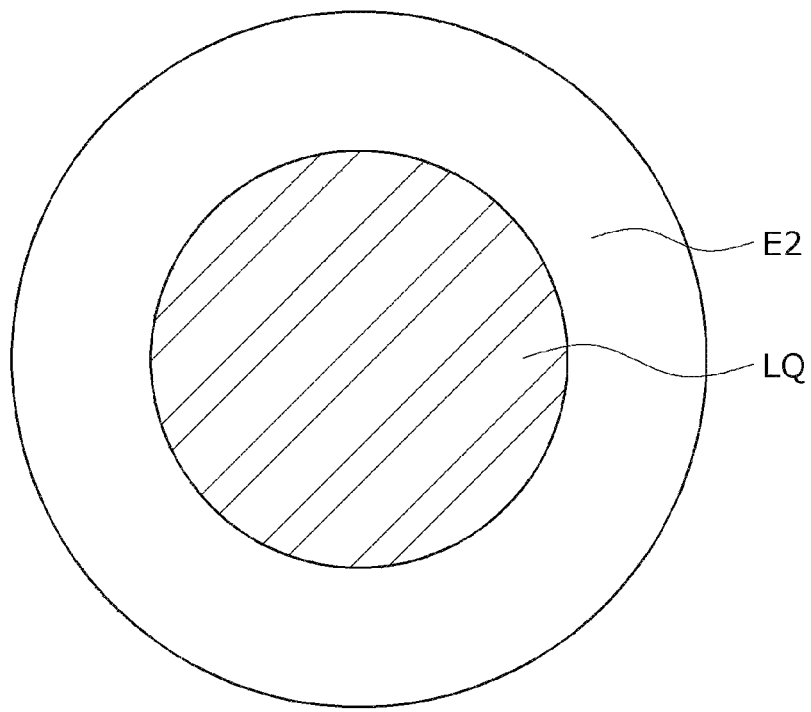

[FIG.7b]
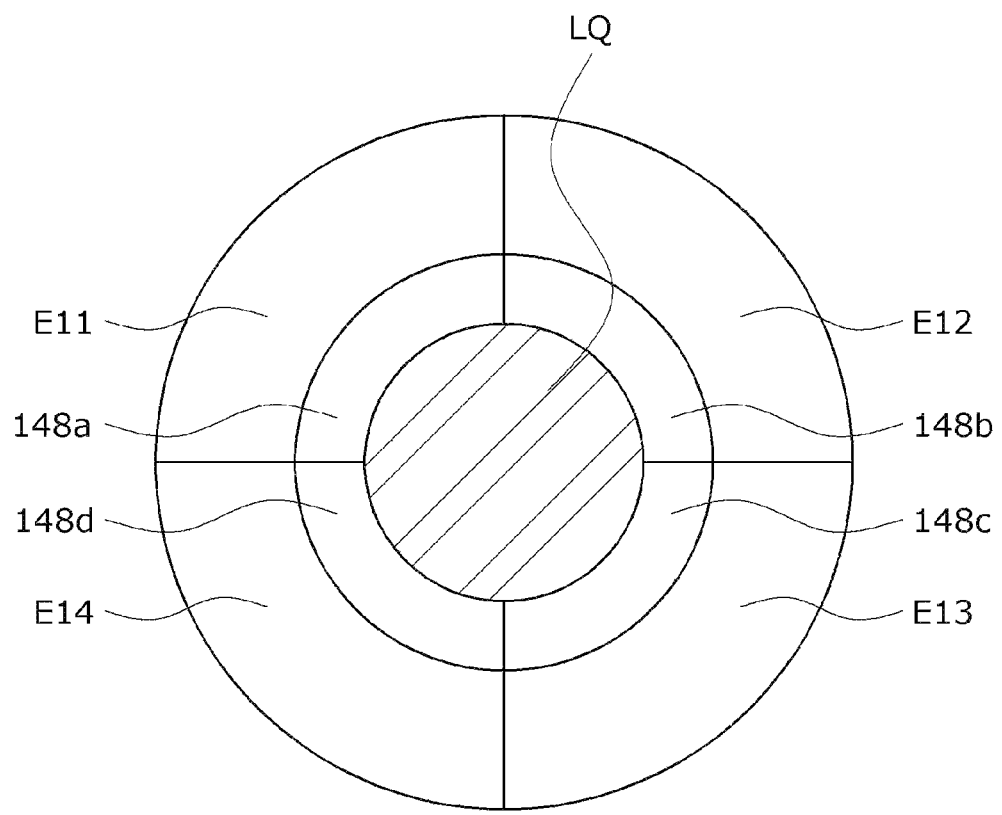

[FIG.7c]
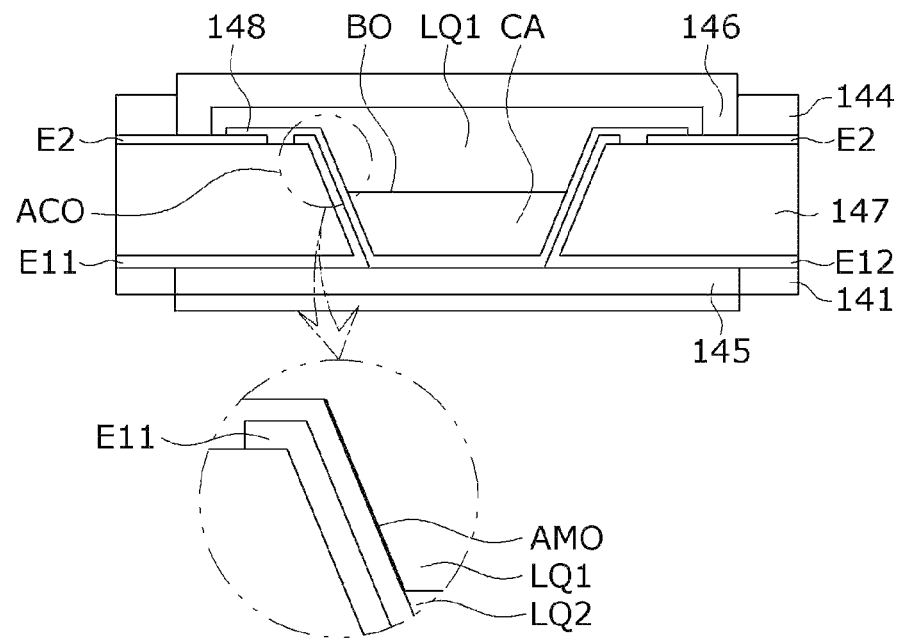
[FIG.8a]
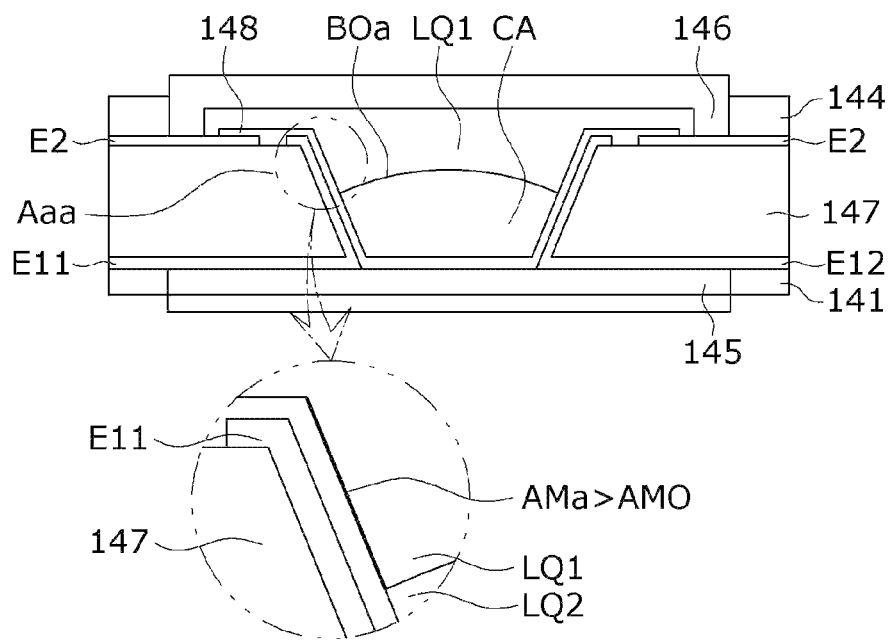

[FIG.8b]
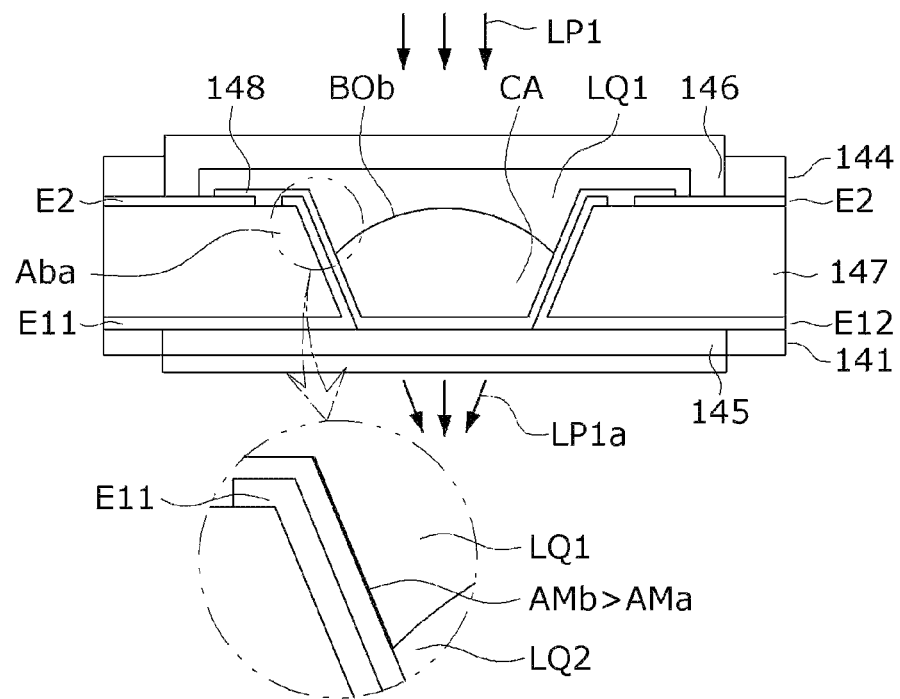

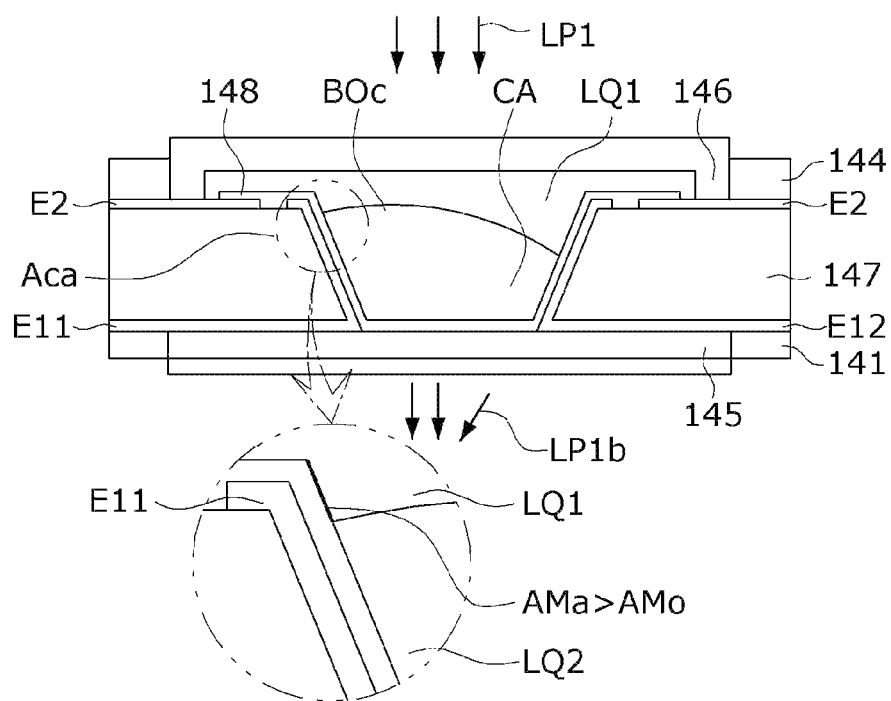
[FIG.8c]

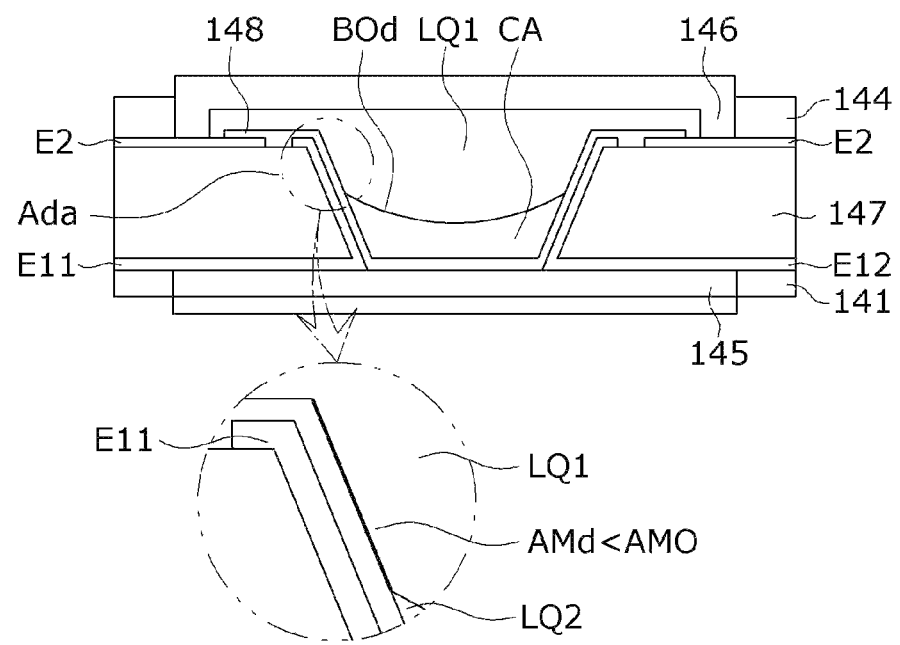
[FIG.8d]

[FIG.8e]
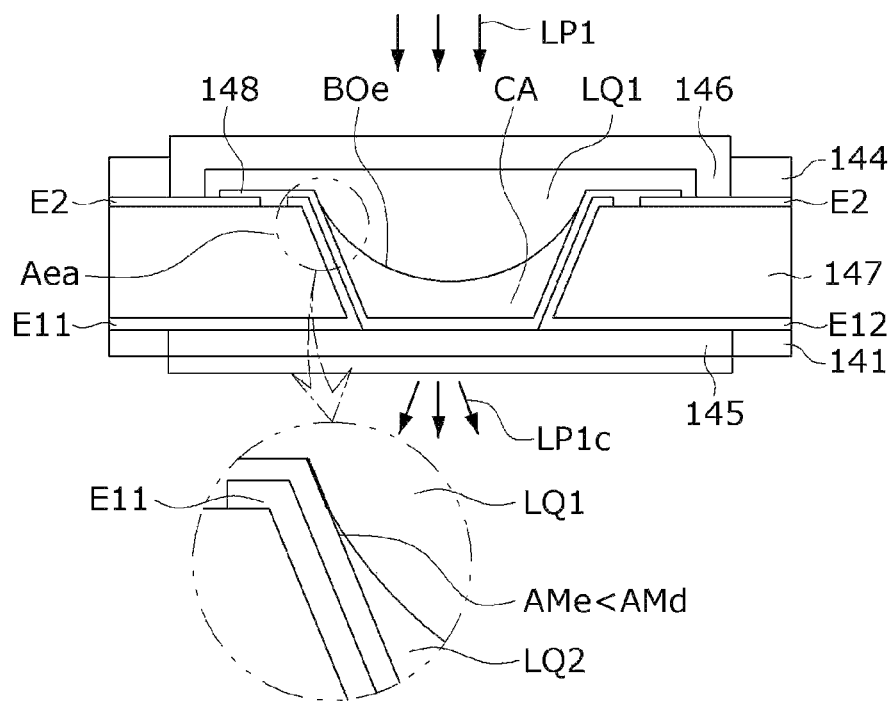

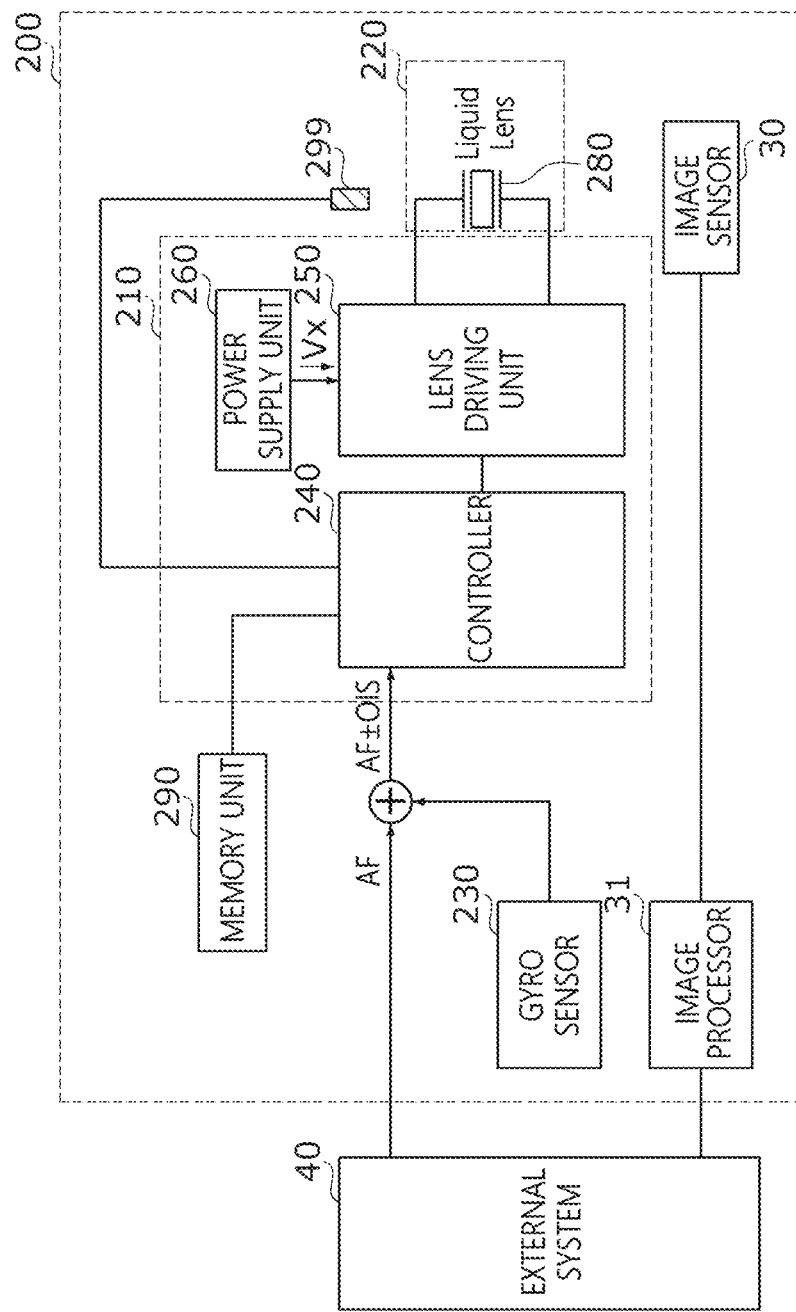
[FIG.9]

[FIG.10]
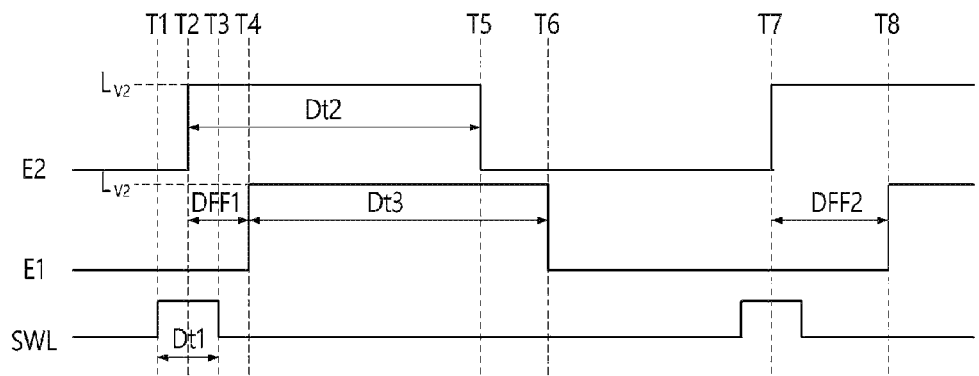
[FIG.11]
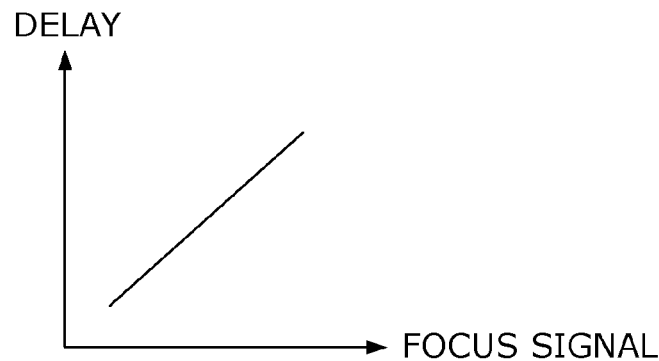

[FIG.12]
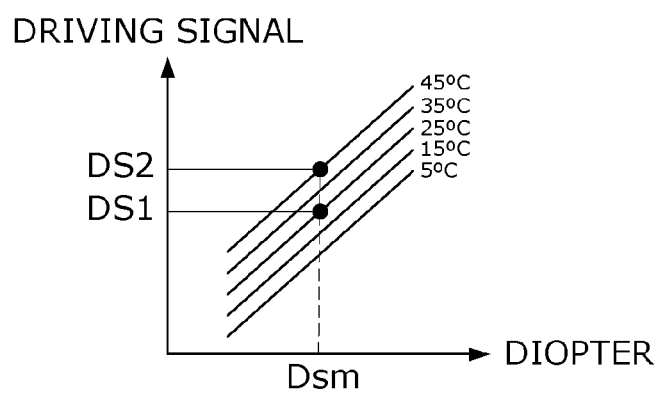

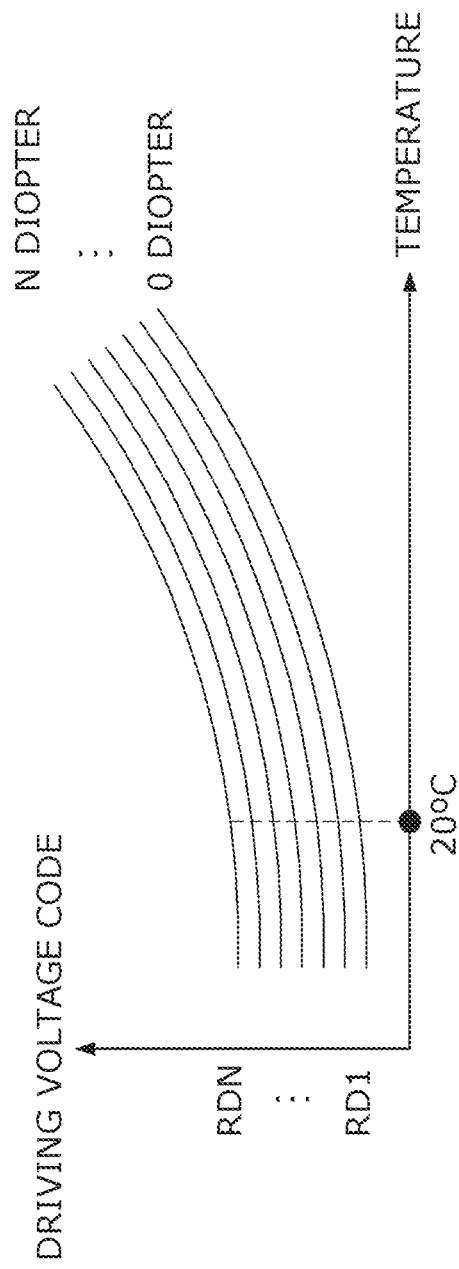
[FIG.13]

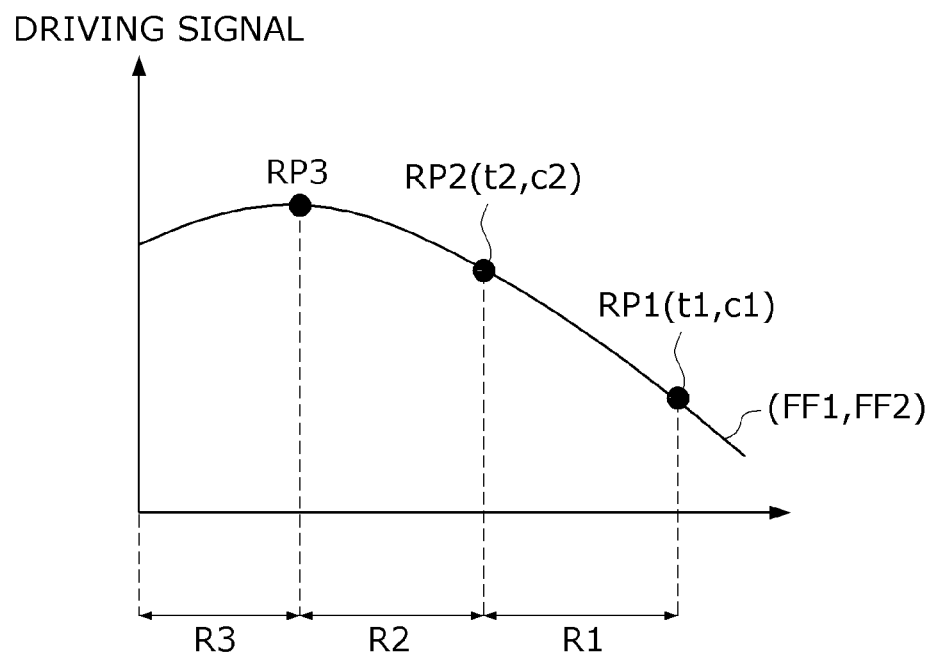
[FIG.14]

【FIG.15】
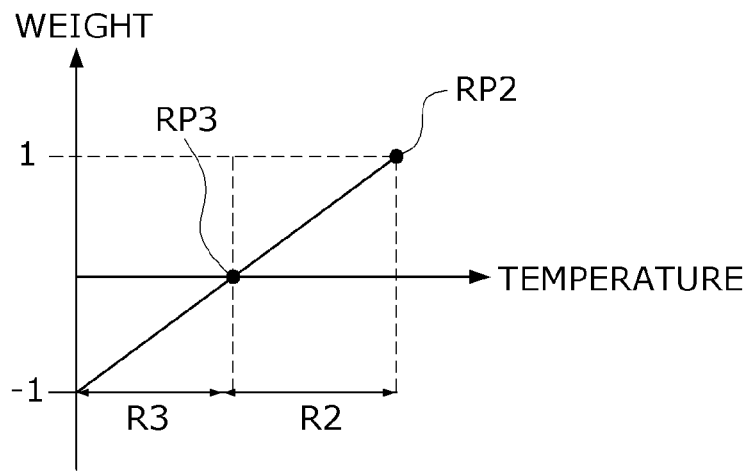
【FIG.16】
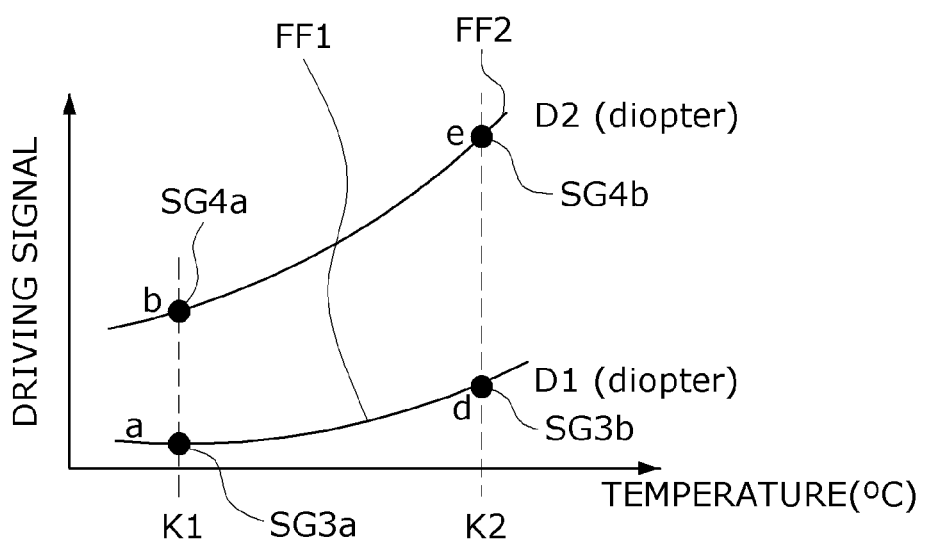

[FIG.17]
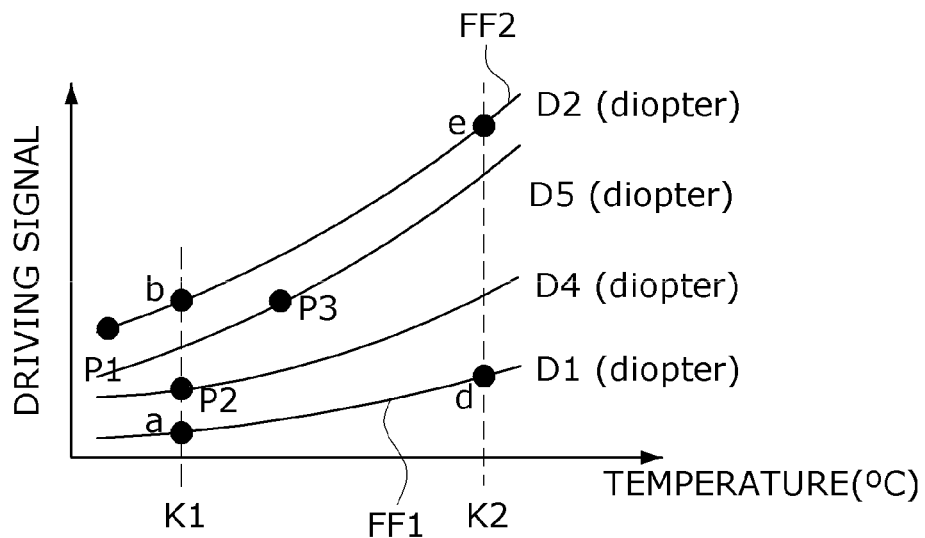
[FIG.18]
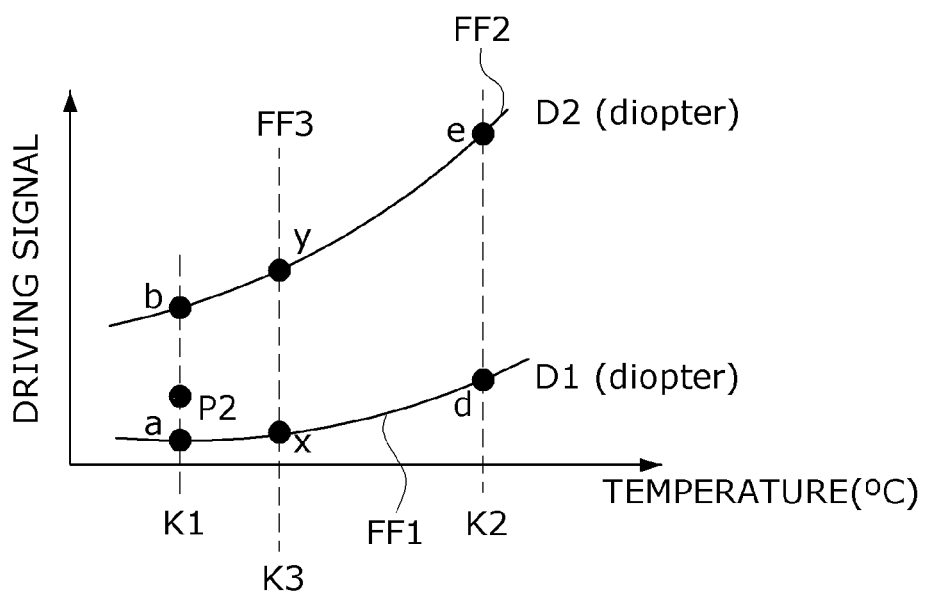

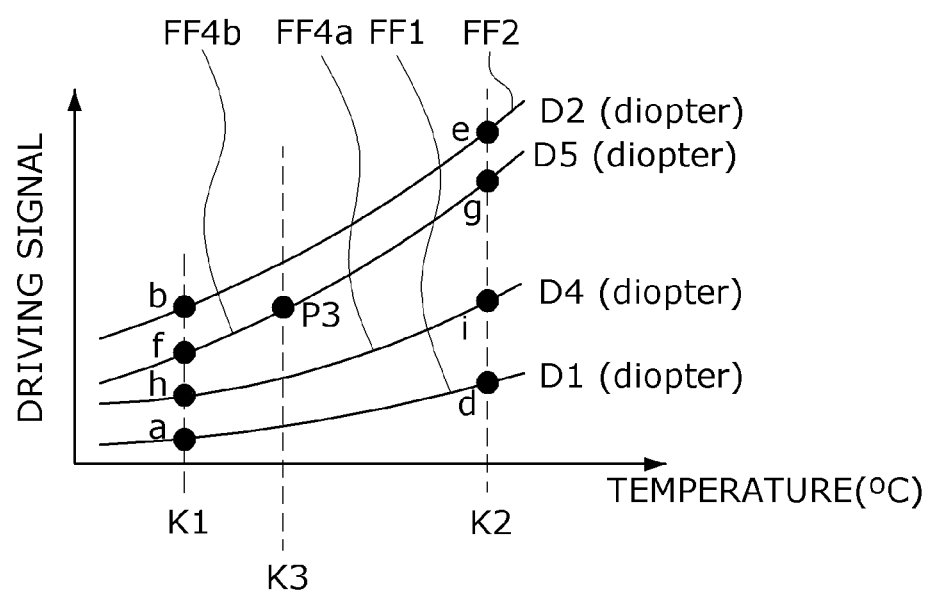
[FIG.19]

OPTICAL DEVICE

CROSS REFERENCE TO RELATED APPLICATIONS

This application is the National Phase of PCT International Application No. PCT/KR2020/015282, filed on Nov. 4, 2020, which claims priority under 35 U.S.C. 119(a) to Patent Application No. 10-2019-0139571, filed in the Republic of Korea on Nov. 4, 2019, all of which are hereby expressly incorporated by reference into the present application.

TECHNICAL FIELD

An embodiment relates to an optical device.

BACKGROUND ART

Users of portable devices demand optical devices that have high resolution, are small in size, and have various photographing functions. For example, the various photographing functions may include at least one of an optical zoom-in/zoom-out function, an auto-focusing (AF) function, and a hand-tremor compensation or optical image stabilizer (OIS) function.

Conventionally, in order to realize the above-described various photographing functions, a method of combining a plurality of lenses and directly moving the combined lenses is used. However, in the case in which the number of lenses is increased as described above, the size of the optical device may be increased.

The auto-focusing function and the hand-tremor compensation function are performed by moving or tilting several lenses, which are fixed to a lens holder and are aligned with an optical axis, along the optical axis or in a direction perpendicular to the optical axis, and to this end, a separate lens-driving device is required to drive a lens assembly composed of a plurality of lenses. However, the lens-driving device exhibits high power consumption, and in order to protect the lens-driving device, the overall size of the conventional optical device is increased because a cover glass needs to be separately added to the optical device. In order to solve this, research has been conducted on a liquid lens unit, which performs the auto-focusing function and the hand-tremor compensation function by electrically adjusting a curvature of an interface of two types of liquids.

However, the interface of the liquid lens is variously deformed according to temperature, and thus improvements in accuracy are required.

DISCLOSURE

Technical Problem

The present invention is directed to providing an optical device including a lens capable of adjusting a position of an interface between two liquids according to electrical energy, which is capable of providing a desired diopter even when a diopter changes due to the interface deformed according to a temperature of a structure which allows the two liquids included in the lens to be housed.

Objectives to be solved by the embodiment are not limited to the above-described objective and will include objectives and effects which may be identified by solutions for the objectives and the embodiments described below.

Technical Solution

One aspect of the present invention provides an optical device including a lens assembly that includes a liquid lens including a first liquid and a second liquid forming an interface therebetween, a temperature sensor configured to sense a temperature of the liquid lens, and a controller configured to control a driving signal of the liquid lens, wherein the controller controls the driving signal using a first function when the sensed temperature is in a first temperature range and using a second function different from the first function when the sensed temperature is in a second temperature range.

The first function may be a function whose degree is lower than the second function.

The first function may be a linear function, and the second function may be a quadratic function.

The first temperature range may be a range having a higher temperature than the second temperature range, and a value of the driving signal in the first temperature range may be smaller than a value of the driving signal in the second temperature range.

The optical device may include a memory unit configured to store the first function and the second function, wherein the first function and the second function may be functions of the driving signal according to the temperature when the lens assembly has a first diopter.

A variation of the driving signal may be constant according to the temperature, in the first temperature range, and the variation of the driving signal may be changed according to the temperature, in the second temperature range.

The controller may control the driving signal using a third function in a third temperature range lower than the second temperature range, and a temperature at a boundary between the second temperature range and the third temperature range may be a temperature when a value calculated with the second function is a maximum value.

A third function of the third temperature range may be a quadratic function or a constant.

The third function may be a function identical to the second function.

The temperature of the liquid lens may be a temperature measured in the liquid lens or the lens assembly.

Advantageous Effects

According to an embodiment, it is possible to provide an optical device having a desired focus and resolution even when an interface of a liquid lens changes according to temperature.

Various advantages and effects of the present invention are not limited to the above description and can be more easily understood through the description of specific exemplary embodiments of the present invention.

DESCRIPTION OF DRAWINGS

FIG. 1 is a schematic perspective view of an optical device according to an embodiment.

FIG. 2 is an exploded perspective view of the optical device according to the embodiment.

FIG. 3 is a cross-sectional view of the optical device according to the embodiment.

FIG. 4 is a cross-sectional view of a liquid lens unit according to the embodiment.

FIGS. 5A to 5E are views for describing a method of driving the liquid lens unit.

FIG. 6 is a view for describing the liquid lens unit in which an interface is adjusted according to a driving voltage.

FIGS. 7A to 7C are views illustrating a structure of the liquid lens unit.

FIGS. 8A to 8E are views for describing a variation in a lens curvature of the liquid lens unit.

FIG. 9 is a block diagram of an optical device according to the embodiment.

FIG. 10 is a diagram referenced in the description of FIG. 9.

FIGS. 11 to 13 are diagrams for describing relationships between a focus signal, a temperature, a diopter, and a delay to describe the operation of a controller according to the embodiment.

FIG. 14 is a diagram for describing a driving signal graph according to temperature calculated by the controller according to the embodiment.

FIG. 15 is a diagram for describing a relationship between a second section and a third section in FIG. 14.

FIGS. 16 to 19 are diagrams for describing the driving of the controller according to the embodiment.

MODES OF THE INVENTION

Hereinafter, exemplary embodiments of the present invention will be described in detail with reference to the accompanying drawings.

However, the technical spirit of the present invention is not limited to some embodiments to be disclosed below but may be realized in many different forms, and one or more components of each of the embodiments may be selectively combined and substituted within the scope of the present invention.

In addition, unless clearly and expressly defined herein, the terms (including technical and scientific terms) used in the embodiments of the present invention have the same meaning as commonly understood by one of ordinary skill in the art. It should be further understood that terms, such as those defined in commonly used dictionaries, should be interpreted as having a meaning that is consistent with their meaning in the context of the related art.

Further, the terms used in the embodiments of the present invention are provided only to describe embodiments of the present invention and not for purposes of limitation.

In the present specification, the singular forms include the plural forms unless the context clearly indicates otherwise, and the phrase "at least one element (or one or more elements) of an element A, an element B, and an element C," should be understood as including the meaning of at least one of all possible combinations of the element A, the element B, and the element C.

Further, in describing components of the embodiments of the present invention, the terms such as first, second, A, B, (a), (b), and the like may be used.

These terms are merely for distinguishing one component from another component, and the property, order, sequence, and the like of the corresponding components are not limited by the terms.

In addition, it will be understood that when one component is referred to as being "connected" or "coupled" to another component, the component may not only be directly connected or coupled to another component but may also be connected or coupled to another component with still another component presented between one component and another component.

Further, when one component is referred to as being formed or disposed "on (above)" or "under (below)" another component, the terms "on (above)" or "under (below)" includes both of a case in which the two components are in direct contact with each other or a case in which one or more components are (indirectly) formed or disposed between the two components. In addition, the term "on (above)" or "under (below)" includes a case in which another component is disposed in an upward direction or a downward direction with respect to one component.

The term "auto-focusing function" used below is defined as a function of focusing on an object by moving a lens in an optical-axis direction to adjust a distance to an image sensor according to a distance to the object, in order to allow the image sensor to acquire a clear image of the object. Meanwhile, the "auto-focusing" may correspond to "auto focus (AF)."

The term "hand-tremor compensation function" used below is defined as a function of moving or tilting a lens and/or an image sensor to offset vibrations (movement) generated in the image sensor by an external force. Meanwhile, the "hand-tremor compensation" may correspond to "optical image stabilization (OIS)."

FIG. 1 is a schematic perspective view of an optical device according to an embodiment.

Referring to FIG. 1, an optical device 100 may include a lens assembly 10, a control circuit 20, and an image sensor 30. Hereinafter, the optical device may include a camera module.

First, the lens assembly 10 may include a plurality of lens units and a holder in which the plurality of lens units are accommodated. As will be described below, the plurality of lens units may include a liquid lens and may further include a first lens unit or a second lens unit. The plurality of lens units may include first and second lens units and a liquid lens unit.

The control circuit 20 serves to supply a driving voltage (or an operating voltage) to the liquid lens unit.

The control circuit 20 and the image sensor 30 may be disposed on a single printed circuit board (PCB), but this is merely given by way of example, and the embodiment is not limited thereto.

When the optical device 100 according to the embodiment is applied to an optical device or optical instrument, the configuration of the control circuit 20 may be designed in different ways according to specifications required in the optical device. In particular, the control circuit 20 may be implemented in a single chip to reduce the magnitude of a driving voltage applied to the lens assembly 10. Thus, the size of an optical device mounted on a portable device may be further reduced. A detailed description thereof will be provided below.

FIG. 2 is an exploded perspective view of the optical device according to the embodiment, FIG. 3 is a cross-sectional view of the optical device according to the embodiment, and FIG. 4 is a cross-sectional view of the liquid lens unit according to the embodiment.

Referring to FIGS. 2 and 3, the optical device 100 may include the lens assembly, a main substrate 150, and the image sensor 30. In addition, the optical device 100 may further include a first cover 170 and a middle base 172. In addition, the optical device 100 may further include one or more adhesive members 162 and 164 and a second cover 174. The one or more adhesive members serve to couple or fix a liquid lens unit 140 to a holder 120.

Here, the one or more adhesive members are exemplified as including all of a first adhesive member 162, a second adhesive member 164, and a third adhesive member 166, but the embodiment is not limited thereto. That is, according to another embodiment, the one or more adhesive members may also include only some of the first adhesive member 162, the second adhesive member 164, and the third adhesive member 166.

Further, according to the embodiment, at least one of the components 110 to 190 of the optical device 100 illustrated in FIG. 2 may be omitted. Alternatively, at least one component different from the components 110 the 190 illustrated in FIG. 2 may be further included in the optical device 100.

For convenience of description, the third adhesive member 166, the first cover 170, the second cover 174, and an optical layer 190 illustrated in FIG. 2 are omitted in FIG. 3.

Further, the lens assembly 10 (see FIG. 1) may include at least one of the liquid lens unit 140, the holder 120, a first lens unit 110, a second lens unit 130, the first adhesive member 162, the second adhesive member 164, and the third adhesive member 166. In addition, the lens assembly may be disposed above the main substrate 150.

In addition, in order to distinguish the lens assembly from the liquid lens unit 140, the first lens unit 110 and the second lens unit 130 may be referred to as a "first solid lens unit" and a "second solid lens unit," respectively.

The first lens unit 110 may be disposed on an upper side of the lens assembly and may be a region on which light is incident from the outside of the lens assembly. That is, the first lens unit 110 may be disposed above the liquid lens unit 140 in the holder 120. The first lens unit 110 may be implemented as a single lens and may be implemented as two or more lenses that are aligned along a central axis to form an optical system. Here, the central axis may be an optical axis LX of the optical system, which is formed by the first lens unit 110, the liquid lens unit 140, and the second lens unit 130 included in the optical device 100, and may be an axis parallel to the optical axis LX. The optical axis LX may be the same as an optical axis f of the image sensor 30.

That is, the first lens unit 110, the liquid lens unit 140, the second lens unit 130, and the image sensor 30 may be aligned and disposed along the optical axis LX through active alignment (AA). Here, the active alignment may be an operation of aligning the optical axes of the first lens unit 110, the second lens unit 130, and the liquid lens unit 140, and adjusting an axis relationship or a distance relationship between the image sensor 30 and the lens units 110, 130, and 140 in order to acquire an improved image.

In an embodiment, the active alignment may be performed by an operation of analyzing image data generated by receiving light, which is reflected from a specific object, through at least one of the first lens unit 110, the second lens unit 130, and the liquid lens unit 140 by the image sensor 30. For example, the active alignment may be performed in the following sequence.

As an example, after active alignment (first alignment) that adjusts relative positions between the first and second lens units 110 and 130 and the image sensor 30, which are fixed and mounted to the holder 120, is completed, and active alignment (second alignment) that adjusts relative positions between the liquid lens unit 140, which is inserted into the holder 120, and the image sensor 30 may be performed. The first alignment may be performed while a gripper grips the middle base 172 and moves the middle base to various positions, and the second alignment may be performed while the gripper grips a spacer 143 of the liquid lens unit 140 and moves the spacer to various positions. However, the active alignment may be performed in a sequence different from the above-described sequence.

In addition, the holder 120 may include a holder upper region 120U disposed above the liquid lens unit 140 and a holder lower region 120D disposed below the liquid lens unit 140. In this case, the first and second adhesive members 162 and 164 may respectively couple the holder upper region 120U and the holder lower region 120D to the liquid lens unit 140.

In addition, when the first and second adhesive members 162 and 164 are disposed, the liquid lens unit 140 may be stably fixed and coupled to the holder 120.

Further, the first lens unit 110 may include, for example, two lenses L1 and L2, but this is exemplary, and the number of the lenses included in the first lens unit 110 may be one or more.

In addition, an exposure lens may be disposed on an upper side of the first lens unit 110. Here, the exposure lens may be an outermost lens among the lenses included in the first lens unit 110. That is, the lens L1 positioned at the uppermost side of the first lens unit 110 may protrude upward and thus perform a function of the exposure lens. A surface of the exposure lens protrudes to the outside of the holder 120 and thus may be damaged. When the surface of the exposure lens is damaged, the quality of an image captured by the optical device 100 may be degraded. Accordingly, in order to prevent or suppress damage to the surface of the exposure lens, a glass cover may be disposed, or a coating layer may be formed on an upper portion of the exposure lens. Alternatively, in order to prevent damage to the surface of the exposure lens, the exposure lens may be implemented using a wear-resistant material having higher rigidity than other lenses in the lens unit.

Further, an outer diameter of each of the lenses L1 and L2 included in the first lens unit 110 may increase toward a lower portion (e.g., in a −z-axis direction), but the embodiment is not limited thereto.

Light incident on the first lens unit 110 from the outside of the optical device 100 may pass through the liquid lens unit 140 and may be incident on the second lens unit 130. The second lens unit 130 may be implemented as a single lens and may be implemented as two or more lenses that are aligned along the central axis to form an optical system. For example, as illustrated in FIG. 3A, the second lens unit 130 may include three lenses L3, L4, and L5, but this is exemplary, and one or two lenses or four or more lenses may be included in the second lens unit 130.

Further, an outer diameter of each of the lenses L3, L4, and L5 included in the second lens unit 130 may increase toward a lower portion thereof (e.g., in the −z-axis direction), but the embodiment is not limited thereto.

In addition, unlike the liquid lens unit 140, each of the first lens unit 110 and the second lens unit 130 may be a solid lens and may be formed of glass or plastic, but the embodiment is not limited to a specific material of each of the first lens unit 110 and the second lens unit 130.

Further, the liquid lens unit 140 may include first to fifth regions A1, A2, A3, A4, and A5. Specifically, the fourth region A4 and the fifth region A5 are positioned on outermost sides of the optical device 100, and the first region A1, the second region A2, and the third region A3 may be disposed between the fourth region A4 and the fifth region A5. In addition, the third region A3 may be disposed between the first region A1 and the second region A2. In addition, the first region A1 may be disposed between the fourth region A4 and the third region A3, and the second region A2 may be disposed between the third region A3 and the fifth region A5.

In other words, the first region A1 and the second region A2 may be regions disposed in openings of side surfaces of the holder 120. The third region A3 may be a region between the first region A1 and the second region A2. In addition, the fourth region A4 and the fifth region A5 are regions that protrude from openings in the holder 120, and are regions disposed outside the holder 120 at the openings.

Hereinafter, the first adhesive member 162 and the second adhesive member 164 will be described, and the liquid lens unit 140 will be described below.

The first adhesive member 162 may include first and second adhesive portions 162-1 and 162-2, and the second adhesive member 164 may include third and fourth adhesive portions 164-1 and 164-2. The adhesive portion may include an adhesive, an epoxy, or the like.

First, the first adhesive portion 162-1 couples the holder 120 and an upper surface 140TS of the fourth region A4 of the liquid lens unit 140, and the third adhesive portion 164-1 couples the holder 120 and the upper surface of the fifth region A5 of the liquid lens unit 140, and here, the upper surface 140TS of each of the fourth region A4 and the fifth region A5 of the liquid lens unit 140 is exemplified as being an upper surface of a first connection substrate 141, but the embodiment is not limited thereto. For example, when the liquid lens unit 140 does not include connection substrates 141 and 144 or the spacer 143, the upper surface of the liquid lens unit 140 may be an upper surface of a liquid lens 142.

Further, the holder 120 may include a holder upper portion disposed above the liquid lens unit 140 (or the liquid lens 142) and a holder lower portion disposed below the liquid lens unit 140 (or the liquid lens 142). In addition, the holder 120 may also include a side wall facing a side surface of the liquid lens 142 or the liquid lens unit 140. The first adhesive portion 162-1 and the third adhesive portion 164-1 may couple the holder upper region 120U and the liquid lens unit 140, respectively. In this way, each of the first adhesive portion 162-1 and the third adhesive portion 164-1 couples the holder 120 and the liquid lens unit 140 so that the liquid lens unit 140 may be fixed to the holder 120.

Further, the second adhesive portion 162-2 may couple the holder 120 and a lower surface and a side surface of the fourth region A4 of the liquid lens unit 140. Here, the lower surface of the liquid lens unit 140 is exemplified as being a lower surface of a second connection substrate 144, and the side surface of the liquid lens unit 140 is exemplified as being a side surface of the spacer 143, but the embodiment is not limited thereto. For example, when the liquid lens unit 140 does not include the first and second connection substrates 141 and 144 or the spacer 143, the lower surface and the side surface of the liquid lens unit 140 may be the lower surface and the side surface of the liquid lens 142, respectively. Similarly, the fourth adhesive portion 164-2 may couple the holder 120 and the lower surface and the side surface of the fifth region A5 of the liquid lens unit 140. Here, the lower surface of the liquid lens unit 140 may be the lower surface of the second connection substrate 144, and the side surface of the liquid lens unit 140 may be the side surface of the spacer 143, but the embodiment is not limited thereto. For example, when the liquid lens unit 140 does not include the connection substrates 141 and 144 or the spacer 143, the lower surface and the side surface of the liquid lens unit 140 may be the lower surface and the side surface of the liquid lens 142, respectively.

In addition, each of the second adhesive portion 162-2 and the fourth adhesive portion 164-2 may couple the holder lower region 120d and the liquid lens unit 140. In this way, each of the second adhesive portion 162-2 and the fourth adhesive portion 164-2 may couple the holder 120 and the liquid lens unit 140 so that the opening of the holder 120 may be sealed. For example, the first adhesive portion 162-1 and the second adhesive portion 162-2 may be connected to each other, and the third adhesive portion 164-1 and the fourth adhesive portion 164-2 may be connected to each other, thereby performing the above-described sealing.

Although not shown in the drawings, the third adhesive member 166 may be disposed to fill a separation space (or gap) between the upper surface of the holder 120 and the first cover 170. In addition, the third adhesive member 166 may be omitted in some cases. In this case, the separation space between the upper surface of the holder 120 and the first cover 170 may be empty.

The embodiment is not limited to the shape of the first to third adhesive members 162, 164, and 166. That is, the first to third adhesive members 162, 164, and 166 may have various shapes as long as the adhesive members seal the inside of the holder 120 in order to inhibit external foreign substances from flowing into the holder 120 through the opening of the holder 120. For example, when the third adhesive member 166 is disposed to fill the separation space between the upper surface of the holder 120 and the first cover 170 in a state in which the first adhesive member 162 and the second adhesive member 164 are disposed to seal the openings of the holder 120, the third region A3 of the liquid lens unit 140 disposed in an inner space of the holder 120 may be sealed from the outside. Accordingly, in the optical device 100 according to the embodiment, reliability against foreign substances can be improved, optical performance can be prevented from being degraded, and a defect rate can be reduced.

In addition, each of the first to fourth adhesive portions 162-1, 164-1, 162-2, and 164-2 may have various shapes. That is, the first adhesive portion 162-1, the second adhesive portion 162-2, the third adhesive portion 164-1, and the fourth adhesive portion 164-2 may have shapes corresponding to the shapes of the openings of the holder 120.

In addition, an adhesive may be disposed in the first and second regions A1 and A2 as well as the fourth region A4 and the fifth region A5, but the present invention is not limited thereto.

Further, the first cover 170 may be disposed to surround the holder 120, the liquid lens unit 140, the middle base 172, and a sensor base 178. Accordingly, the first cover 170 may be in contact with a shoulder-side upper surface 120S of the holder 120. In this case, when an upper surface 162S of each of the first adhesive portion 162-1 and the third adhesive portion 164-1 is positioned higher than the shoulder-side upper surface 120S of the holder 120, the first cover 170 may be in contact with the upper surface 162S of each of the first adhesive portion 162-1 and the third adhesive portion 164-1, instead of the shoulder-side upper surface 120S of the holder 120. Accordingly, the first cover 170 may be unstably fixed to the holder 120. In order to prevent this, the upper surface 120S of the holder 120 may be disposed higher than the upper surface 162S of the first adhesive portion 162-1 by a predetermined height. Similarly, the upper surface 120S of the holder 120 may be positioned higher than the upper surface 164S of the third adhesive portion 164-1 by a predetermined height.

Further, the height of the upper surface 120S of the holder 120 may be equal to the height of the upper surface 162S of the first adhesive portion 162-1, and the height of the upper surface 120S of the holder 120 may be equal to the height of the upper surface 164S of the third adhesive portion 164-1.

In addition, in the above description, the liquid lens unit 140, which is given when describing the features of the first adhesive member 162 and the second adhesive member 164, includes the first and second connection substrates 141 and 144. However, the liquid lens unit 140, which is given when describing the features of the first adhesive member 162 and the second adhesive member 164, may not include the first and second connection substrates 141 and 144.

Further, the first cover 170 may be disposed to surround the holder 120, the liquid lens unit 140, the third adhesive member 166, and the middle base 172 and may protect these (the holder 120, the liquid lens unit 140, the third adhesive member 166, and the middle base 172) from an external impact. In particular, as the first cover 170 is disposed, the plurality of lenses, which form an optical system, may be protected from an external impact.

Further, the first cover 170 may include an upper opening 170H formed in an upper surface of the first cover 170. Accordingly, the first lens unit 110 disposed in the holder 120 may be exposed to external light.

In addition, the middle base 172 may be disposed to surround the hole of the holder 120. Accordingly, the middle base 172 may include an accommodation hole 172H for accommodating the hole of the holder 120. An inner diameter of the middle base 172 (i.e., a diameter of the accommodation hole 172H) may be greater than or equal to an outer diameter of the hole of the holder 120. In addition, each of the accommodation hole 172H of the middle base 172 and the holes of the holder 120 is illustrated as having a circular shape, but the embodiment is not limited thereto, and these holes may be changed to various shapes. In addition, the middle base 172 may be mounted on the main substrate 150 to be spaced apart from a circuit element 151 on the main substrate 150.

Like the upper opening 170H of the first cover 170, the accommodation hole 172H may be formed at a position near a center of the middle base 172 at a position corresponding to the position of the image sensor 30 disposed on the optical device 100.

Further, the optical device 100 may further include the sensor base 178 and a filter 176 and may further include a circuit cover 154.

The filter 176 may filter light in a specific wavelength range, wherein the light has passed through the first lens unit 110, the liquid lens unit 140, and the second lens unit 130. The filter 176 may be an infrared (IR) light-blocking filter or an ultraviolet (UV) light-blocking filter, but the embodiment is not limited thereto.

Further, the filter 176 may be disposed above the image sensor 30. The filter 176 may be disposed inside the sensor base 178. For example, the filter 176 may be disposed or mounted in an inner recess or on a stepped portion of the sensor base 178.

The sensor base 178 may be disposed below the middle base 172 and attached to the main substrate 150. The sensor base 178 may surround the image sensor 30 and protect the image sensor 30 from external foreign substances or impacts.

Next, the main substrate 150 may be disposed below the middle base 172 and may include a recess which the image sensor 30 may be mounted in, seated in, in contact with, fixed in, provisionally fixed in, supported in, coupled to, or accommodated in, the circuit element 151, a connection part (or a flexible printed circuit board (FPCB)) 152, and a connector 153.

Specifically, the main substrate 150 may include a holder region in which the holder 120 is disposed, and an element region in which a plurality of circuit elements 151 are disposed.

The main substrate 150 may be implemented as a rigid-flexible printed circuit board (RFPCB) including the FPCB 152. The FPCB 152 may be bent based on the requirement of a space in which the optical device 100 is mounted.

In addition, the circuit element 151 of the main substrate 150 may configure a control module configured to control the liquid lens unit 140 and the image sensor 30. Here, the control module will be described below.

The circuit element 151 may include at least one of a passive element and an active element and may have any width and height. The circuit element 151 may be provided as a plurality of circuit elements 151 and may protrude outward with a height greater than a height of the main substrate 150. The plurality of circuit elements 151 may be disposed to not overlap the holder 120 in a direction parallel to the optical axis LX. For example, the plurality of circuit elements 151 may include a power inductor, a gyro sensor, and the like, but the embodiment is not limited to a specific type of the circuit element 151.

The circuit cover 154 may be disposed to cover the circuit element 151. Accordingly, the circuit cover 154 may protect the circuit element 151 disposed on an upper portion of the main substrate 150 from an external impact. Further, to this end, the circuit cover 154 may include an accommodation space for accommodating and covering the circuit element 151 in consideration of the shape and position of the circuit element 151 disposed on the main substrate 150. In addition, the circuit cover 154 may have an electromagnetic shielding function.

The image sensor 30 may perform a function of converting light that has passed through the first lens unit 110, the liquid lens unit 140, and the second lens unit 130 of the lens assembly (110, 120, 130, 140, 162, and 164) into image data. More specifically, the image sensor 30 may generate image data by converting light into an analog signal through a pixel array including a plurality of pixels and synthesizing a corresponding digital signal to the analog signal.

Referring to FIGS. 3 and 4, the liquid lens unit 140 may include the liquid lens (or liquid lens body) 142 and a connection substrate. In addition, the liquid lens unit 140 may further include the spacer 143. The connection substrate may include the first connection substrate (or an individual electrode connection substrate) 141 and the second connection substrate (or a common electrode connection substrate) 144.

The first connection substrate 141 may electrically connect a plurality of first electrodes (not shown) included in the liquid lens 142 to the main substrate 150 and may be disposed above the liquid lens 142. The first connection substrate 141 may be implemented as an FPCB.

Further, the first connection substrate 141 may be electrically connected to an electrode pad 150-1, which is formed on the main substrate 150, through a connection pad 141-1 electrically connected to each of the plurality of first electrodes. To this end, after the liquid lens unit 140 is inserted into the inner space of the holder 120, the first connection substrate 141 may be bent in the −z-axis direction toward the main substrate 150, and then, the connection pad 141-1 and the electrode pad 150-1 may be electrically connected to each other through a conductive epoxy. In another embodiment, the first connection substrate 141 may be connected to a first holder surface electrode, which is conductive and disposed, formed, or applied on a surface of the holder 120, to be electrically connected to the main substrate 150 through the first holder surface electrode, which is conductive and is disposed on the surface of the holder 120, but the embodiment is not limited thereto.

The second connection substrate 144 may electrically connect a second electrode (not illustrated) included in the liquid lens 142 to the main substrate 150 and may be disposed below the liquid lens 142. The second connection substrate 144 may be implemented as an FPCB or a single metal substrate (conductive metal plate).

Further, the second connection substrate 144 may be electrically connected to an electrode pad, which is formed on the main substrate 150, through a connection pad electrically connected to the second electrode. To this end, after the liquid lens unit 140 is inserted into the inner space of the holder 120, the second connection substrate 144 may be bent in the −z-axis direction toward the main substrate 150. In another embodiment, the second connection substrate 144 may be connected to a surface electrode, which is conductive and disposed, formed, or applied on the surface of the holder 120, to be electrically connected to the main substrate 150 through the surface electrode, which is conductive and is disposed on the surface of the holder 120, but the embodiment is not limited thereto.

The liquid lens 142 may include a cavity CA. In addition, an opening area in a direction in which light enters the cavity CA may be smaller than an opening area opposite thereto. Alternatively, the liquid lens 142 may be disposed such that a direction of inclination of the cavity CA is opposite to that illustrated in the drawing. In addition, the opening area in the direction in which light enters the cavity CA may be greater than the opening area opposite thereto. In addition, when the liquid lens 142 is disposed such that the direction of inclination of the cavity CA is reversed, a portion or the entirety of the arrangement of components included in the liquid lens 142 may be changed, or only the direction of inclination of the cavity CA may be changed and the remainder of the arrangement of the components may not be changed, according to the direction of inclination of the liquid lens 142.

The spacer 143 may be disposed to surround the liquid lens 142 and may protect the liquid lens 142 from an external impact. To this end, the spacer 143 may have a shape in which the liquid lens 142 may be mounted in, seated in, in contact with, fixed to, provisionally fixed to, supported by, coupled to, or disposed in the spacer 143.

For example, the spacer 143 may include a hollow space 143H in which the liquid lens 142 is accommodated, and a frame configured to surround the hollow space 143H formed in a center thereof. In this way, the spacer 143 may have a centrally-hollowed quadrangular planar shape (hereinafter, referred to as a "☐"-shaped form), but the embodiment is not limited thereto.

Further, the spacer 143 may be disposed between the first connection substrate 141 and the second connection substrate 144 and may be disposed to protrude from the opening of the holder 120.

Further, the liquid lens 142 may include a plurality of different types of liquids LQ1 and LQ2, first to third plates 147, 145, and 146, first and second electrodes E1 and E2, and an insulating layer 148. The liquid lens 142 may further include the optical layer 190.

In addition, the plurality of liquids LQ1 and LQ2 may be accommodated in the cavity CA, and may include a first liquid LQ1 having conductivity and a second liquid (or an insulating liquid) LQ2 having non-conductivity. In addition, the first liquid LQ1 and the second liquid LQ2 may not be mixed with each other, and an interface BO may be formed at a contact portion between the first and second liquids LQ1 and LQ2. In addition, the second liquid LQ2 may be disposed on the first liquid LQ1, but the embodiment is not limited thereto.

Further, in a cross-sectional shape of the liquid lens 142, an edge of each of the first and second liquids LQ1 and LQ2 may be thinner than a central portion each thereof. However, the present invention is not limited thereto.

An inner side surface of the first plate 147 may form a sidewall i of the cavity CA. The first plate 147 may include upper and lower openings having a predetermined inclined surface. That is, the cavity CA may be a region surrounded by the inclined surface of the first plate 147, the second plate 145, and the third plate 146.

Further, according to the embodiment, a size (or an area or a width) $O_2$ the lower opening may be larger than a size (or an area or a width) $O_1$ of the upper opening. Here, the size of each of the upper and lower openings may be a sectional area in a horizontal direction (e.g., an x-axis direction and a y-axis direction). For example, the size of the opening may be a radius when the opening has a circular cross section and may be a diagonal length when the opening has a square cross section. In addition, a diameter of the opening may be changed depending on a field of view (FOV) required for the liquid lens 142 or the role of the liquid lens 142 to be performed in the optical device 100.

In addition, each opening may have the form of a hole having a circular cross section, and an inclined surface thereof may have an inclination. The interface BO may move along the inclined surface of the cavity CA by a driving voltage.

In addition, as described above, the first liquid LQ1 and the second liquid LQ2 may fill, be accommodated in, or be disposed in the cavity CA. In addition, the cavity CA is a portion through which the light that has passed through the first lens unit 110 is transmitted. Further, since the first plate 147 is positioned outside the cavity CA, the first plate 147 may be made of a transparent material. In addition, the first plate 147 may include impurities so that light is not easily transmitted therethrough.

In addition, the electrode may be disposed on each of one surface and the other surface of the first plate 147. A plurality of first electrodes E1 may be disposed on one surface (e.g., an upper surface, a side surface, or a lower surface) of the first plate 147 to be spaced apart from the second electrode E2. The second electrode E2 may be disposed on at least a partial region of the other surface (e.g., a lower surface) of the first plate 147 and may be in direct contact with the first liquid LQ1.

Further, the first electrodes E1 may include n electrodes (hereinafter, referred to as "individual electrodes"), and the second electrode E2 may include a single electrode (hereinafter, referred to as a "common electrode"). Here, n may be an integer greater than or equal to 2. Here, a case of four first electrodes E1 and one second electrode E2 will be described below. That is, both ends electrically connected to the liquid lens 142 may be any one of the plurality of first electrodes E1 and the second electrode E2.

Further, a portion of the second electrode E2 (i.e., an electrode sector of the second electrode E2) disposed on the other surface of the first plate 147 may be exposed to the first liquid LQ1 having conductivity.

Each of the first and second electrodes E1 and E2 may be made of a conductive material. For example, the first electrode E1 and the second electrode E2 may be made of a metal.

Further, the second plate 145 may be disposed on one surface of the first electrode E1. That is, the second plate 145 may be disposed above the first plate 147. Specifically, the second plate 145 may be disposed above an upper surface of the first electrode E1 and the cavity CA.

The third plate 146 may be disposed on one surface of the second electrode E2. That is, the third plate 146 may be disposed below the first plate 147. Specifically, the third plate 146 may be disposed below a lower surface of the second electrode E2 and the cavity CA.

The second plate 145 and the third plate 146 may be disposed opposite to each other with the first plate 147 interposed therebetween. In addition, at least one of the second plate 145 or the third plate 146 may be omitted.

At least one of the second or third plates 145 and 146 may have a quadrangular planar shape. The third plate 146 may be brought into contact with and bonded to the first plate 147 in a bonding region thereof around the edge.

The second plate 145 and the third plate 146 are regions through which light passes, and may be made of a transparent material. For example, each of the second and third plates 145 and 146 may be made of glass, and may be formed of the same material for convenience of the process. In addition, the edge of each of the second and third plates 145 and 146 may have a quadrangular shape, but the present invention is not necessarily limited thereto.

In addition, the second plate 145 may allow light incident from the first lens unit 110 to enter the cavity CA of the first plate 147.

The third plate 146 may allow the light that has passed through the cavity CA of the first plate 147 to travel to the second lens unit 130. The third plate 146 may be in direct contact with the first liquid LQ1.

According to the embodiment, the third plate 146 may have a diameter larger than a diameter of a wider opening among the upper and lower openings of the first plate 147. In addition, the third plate 146 may include a peripheral region spaced apart from the first plate 147.

For example, an actual effective lens region of the liquid lens 142 may be narrower than the diameter (e.g., $O_2$) of the wider opening among the upper and lower openings of the first plate 147. That is, when a region in a small radius about a central portion of the liquid lens 142 is used as an actual path for transmitting light, a diameter $O_3$ of a central region of the third plate 146 may be smaller than a diameter (e.g., $O_2$) of a wider opening among third and fourth openings of the first plate 147.

The insulating layer 148 may be disposed to cover a portion of a lower surface of the second plate 145 in an upper region of the cavity CA. That is, the insulating layer 148 may be disposed between the second liquid LQ2 and the second plate 145.

Further, the insulating layer 148 may be disposed to cover a portion of the first electrode E1 that forms a sidewall of the cavity CA. In addition, the insulating layer 148 may be disposed on a lower surface of the first plate 147 to cover a portion of the first electrode E1, the first plate 147, and the second electrode E2. Accordingly, the insulating layer 148 may block the first electrode E1 from coming into contact with the first liquid LQ1 and block the first electrode E1 from coming into contact with the second liquid LQ2.

The insulating layer 148 may cover one electrode (e.g., the first electrode E1) of the first and second electrodes E1 and E2 and may expose a portion of another one electrode (e.g., the second electrode E2) so that electric energy is applied to the first liquid LQ1 having conductivity.

Meanwhile, the optical layer 190 may be disposed on one surface of at least one of the second plate 145 or the third plate 146. For example, the optical layer 190 may be disposed on at least one of above and below the second plate 145, may be disposed on at least one of above and below the third plate 146, or may be disposed on at least one of above and below each of the second and third plates 145 and 146.

In addition, the liquid lens 142 and the optical layer 190 are illustrated separately from each other, but the optical layer 190 may be a component of the liquid lens 142. In addition, the optical layer 190 is illustrated as being a single layer, but this is only to indicate the presence of the optical layer 190. That is, the optical layer 190 may be a single layer or a multilayer.

In addition, the optical layer 190 may include at least one of an ultraviolet light-blocking layer, an anti-reflection layer, or an infrared light-blocking layer. The optical layer 190 may be disposed to overlap the image sensor 30 in a direction of the optical axis LX (i.e., a z-axis) or in a direction parallel to the optical-axis direction. In addition, the optical layer 190 may be disposed in the third region A3 of the liquid lens unit 140. For example, the ultraviolet light-blocking layer may block ultraviolet light, particularly, light in the UV-A band. In addition, the anti-reflection layer may serve to prevent light from being reflected from the second plate 145 or the third plate 146, may reduce degradation in light transmittance due to Fresnel loss in the liquid lens 142, and may prevent degradation in visibility of the liquid lens 142 at night. In particular, although not shown in the drawings, the anti-reflection layer may be disposed on an inclined surface and a lower surface of the insulating layer 148, and may prevent degradation in the quality of light transmitted to the image sensor 30 due to the reflection of light.

In addition, the infrared light-blocking (IR cut-off) layer may block light in an infrared band. The infrared light-blocking layer may remove hot spots from an image by preventing external infrared light from being incident onto the liquid lens 142, and may prevent degradation in visibility at night by reducing the reflection of light from a surface of the liquid lens 142.

In addition, at least one of the ultraviolet light-blocking layer, the anti-reflection layer, or the infrared light-blocking layer may be disposed on at least one of a light-receiving portion or a light-emitting portion of the optical device 100 according to the embodiment.

In addition, according to the embodiment, the optical layer 190 may have a coated form or a film form. For example, the anti-reflection layer of the optical layer 190 may be formed by coating at a low temperature by a spray method or the like.

FIGS. 5A to 5E are views for describing a method of driving the liquid lens unit. In the following description, a voltage will be described as being applied between the first electrode and the second electrode. In addition, the corresponding voltage may be the same as the driving voltage, which will be described below.

First, in FIG. 5A, a first voltage V1 is applied to the liquid lens unit 140 so that an interface BO1 of the liquid lens may be convex in a light traveling direction. Thus, it is illustrated that the liquid lens unit operates as a concave lens. In addition, in FIG. 5B, a second voltage V2 greater than the first voltage V1 is applied to the liquid lens unit 140 so that an interface BO2 of the liquid lens may be perpendicular to the light traveling direction. Thus, it is illustrated that the liquid lens unit does not change the light traveling direction. In addition, in FIG. 5C, a third voltage V3 greater than the second voltage V2 is applied to the liquid lens unit 140 so that an interface BO3 of the liquid lens may be convex in a direction opposite to the light traveling direction. Thus, it is illustrated that the liquid lens unit operates as a convex lens. In this case, when the first to third voltages V1 to V3 are applied, the interfaces BO1, BO2, and BO3 of the liquid lens in the liquid lens unit 140 may have different curvatures.

That is, in the liquid lens unit 140 according to the embodiment, it is illustrated that the curvature or diopter of the liquid lens of the liquid lens unit is changed depending on the level of the applied voltage, but the present invention is not limited thereto, and the curvature or diopter of the liquid lens may also be changed depending on a pulse width of an applied pulse.

In addition, FIG. 5D illustrates that the liquid lens in the liquid lens unit 140 operates as a convex lens as the liquid lens in the liquid lens unit 140 has an interface the same as the interface BO3 as in FIG. 5C. Thus, according to FIG. 5D, incident light LPa is converged, and corresponding output light LPb is output.

In addition, FIG. 5E illustrates that the liquid lens in the liquid lens unit 140 has an asymmetric curved surface (e.g., an upper portion of the interface is convex in a direction opposite to the light traveling direction), so that the light traveling direction is changed to one side (e.g., an upper side). That is, according to FIG. 5D, the incident light LPa is converged to the upper side, and corresponding output light LPc is output.

FIG. 6 is a view for describing the liquid lens unit in which the interface is adjusted according to a driving voltage.

Referring to FIG. 6, FIG. 6A illustrates the liquid lens unit, and FIG. 6B illustrates an equivalent circuit of the liquid lens unit.

Referring to FIG. 6A, a lens 142 whose focal length is adjusted according to a driving voltage receives the voltage through individual terminals L1, L2, L3, and L4 that are disposed in four different directions to have the same angular distance therebetween. The individual terminals may be disposed with the same angular distance therebetween with respect to a central axis of the liquid lens and may include four individual terminals. Each of the four individual terminals may be disposed at one of four corners of the liquid lens. When a voltage is applied through the individual terminals L1, L2, L3, and L4, an interface of the liquid lens may be deformed by a driving voltage, which is formed due to interaction between the applied voltage and a voltage applied to a common terminal CO, which will be described below.

Further, referring to FIG. 6B, the liquid lens 142 may have one side to which an operating voltage is applied from the different individual terminals L1, L2, L3, and L4 and another side connected to the common terminal CO. In addition, the common terminal CO may be connected to a plurality of capacitors 149. In addition, the plurality of capacitors 149 included in the equivalent circuit may have a small capacitance of about tens to about 200 pico-farads (pF) or less. The terminals of the liquid lens may be referred to as electrode sectors or sub-electrodes.

FIGS. 7A to 7C are views illustrating a structure of the liquid lens unit, Referring to FIG. 7A, the liquid lens unit 140 may include a common electrode E2 (corresponds to the second electrode, and hereinafter, the second electrode and the common terminal are used interchangeably) at one side thereof. In this case, the common electrode E2 may be disposed in the form of a tube, and a liquid LQ may be disposed in a lower region of the common electrode E2, in particular, in a region corresponding to a hollow.

Meanwhile, although not shown in the drawing, in order to insulate the common electrode E2, an insulating layer may be disposed between the common electrode E2 and the liquid.

In addition, as shown in FIG. 7B, a plurality of first electrodes E11 to E14 (correspond to the individual electrodes, and hereinafter, the first electrodes and the individual terminals are used interchangeably) may be disposed below the common electrode, in particular, below the liquid LQ. The plurality of first electrodes E11 to E14 may be disposed in a shape surrounding, in particular, the liquid LQ.

In addition, a plurality of insulating layers 148*a* to 148*d* for insulation may be disposed between the plurality of first electrodes E11 to E14 and the liquid LQ.

Referring to FIG. 7C, the liquid lens unit 140 may include the plurality of first electrodes E11, E12, E13, and E14 disposed on the first connection substrate 141, the plurality of insulating layers 148*a* to 148*d* for insulating the first electrodes E11, E12, E13, and E14, the second liquid LQ2 disposed on the first electrodes E11, E12, E13, and E14, the first liquid LQ1 disposed on the second liquid LQ2, the second electrode E2 disposed apart from the second liquid LQ2 and the first electrodes E11, E12, E13, and E14, and the second connection substrate 144 disposed on the second electrode E2. In other configurations, the above-described contents may be applied.

Further, the second electrode E2 may be formed in the form of a tube with a hollow. In addition, the second liquid LQ2 and the first liquid LQ1 may be disposed in the hollow. The second liquid LQ2 may be disposed in a circular shape as shown in FIGS. 7A and 7B.

Meanwhile, the hollow region may have a size that increases in a direction from bottom to top, and accordingly, each of the first electrodes E11, E12, E13, and E14 may have a size that decreases in a direction from bottom to top.

In FIG. 7C, a first-first electrode E11 and a first-second electrode E12 among the first electrodes E11, E12, E13, and E14 are each illustrated as being formed to be inclined and having a size that decreases in a direction from bottom to top. Meanwhile, unlike FIGS. 7A to 7C, the first electrodes E11, E12, E13, and E14 may be positioned above the second electrode E2. In other words, the first electrodes E11, E12, E13, and E14 may be positioned below the second electrode E2, but the present invention is not limited thereto.

Further, the first electrodes E11, E12, E13, and E14 are not limited to the above-described number and may be formed of any number.

Further, when a pulse-type electrical signal is applied to the first-first electrode E11 and the first-second electrode E12 after the pulse-type electrical signal is applied to the second electrode E2 and a predetermined period of time elapses, a potential difference is generated between the second electrode E2, the first-first electrode E11, and the first-second electrode E12, and accordingly, a shape of the first liquid LQ1 having electrical conductivity may be changed, and a shape of the second liquid LQ2 inside the second liquid LQ2 may be changed according to the change in the shape of the first liquid LQ1.

Meanwhile, in the present invention, proposed is a method of simply and quickly sensing the curvature of the second liquid LQ2 that changes according to an electrical signal applied to each of the first electrodes E11, E12, E13, and E14 and the second electrode E2. To this end, a sensor unit of the present invention may sense a change in size or area of a boundary region Ac0 between the first liquid LQ1 and the first insulator 148*a* on the first electrode E11 in the liquid lens unit 140.

In FIG. 7C, AM0 is exemplarily given as an area of the boundary region Ac0. In particular, it is illustrated that the area of the boundary region Ac0, which is in contact with the first liquid LQ1, of an inclined portion of a first insulating layer 148a on the first-first electrode E11 is AM0. In addition, it is illustrated that the second liquid LQ2 is not concave or convex and is parallel to the first connection substrate 141 and the like. The curvature at this point may be defined as 0, for example.

For the boundary region Ac0, which is in contact with the first liquid LQ1, of the inclined portion of the first insulating layer 148a on the first-first electrode E11, a capacitance C may be formed according to Equation 1.

$$C = \varepsilon \frac{A}{d} \quad \text{[Equation 1]}$$

Here, ε denotes a dielectric constant of a dielectric 148a, A denotes the area of the boundary region Ac0, and d denotes a thickness of the first dielectric 148a. The capacitance C may be a capacitance of the capacitor 149 illustrated in FIG. 6. Accordingly, since the above-described sensor unit senses the capacitance of the capacitor 149, and the sensor unit may include the capacitor 149.

In addition, when it is assumed here that ε and d are fixed values, the area of the boundary region Ac0 may greatly affect the capacitance C. That is, as the area of the boundary region Ac0 increases, the capacitance C formed in the boundary region Ac0 increases. Meanwhile, since the area of the boundary region Ac0 is varied as the curvature of the second liquid LQ2 is varied, the area of the boundary region Ac0 or the capacitance C formed in the boundary region Ac0 may be sensed using the sensor unit.

Meanwhile, in the present specification, the capacitance in FIG. 7C may be defined as CAc0.

FIGS. 8A to 8E are views for describing a variation in the lens curvature of the liquid lens unit.

FIGS. 8A to 8E illustrate that a first curvature BOa is formed in the second liquid LQ2 according to the application of an electrical signal to each of the first electrodes E11, E12, E13, and E14 and the second electrode E2.

In FIG. 8A, it is illustrated that an area of a boundary region Aaa is AMa (>AM0) when the first curvature BOa is formed in the second liquid LQ2. In particular, it is illustrated that the area of the boundary region Aaa, which is in contact with an electroconductive aqueous solution LQ1, of the inclined portion of the first insulating layer 148a on the first-first electrode E11 is AMa.

According to Equation 1, the area of the boundary region Aaa in FIG. 8A is larger than that in FIG. 7C, and thus the capacitance of the boundary region Aaa becomes larger. Meanwhile, the capacitance in FIG. 8A may be defined as CAaa, which is greater than CAc0 that is the capacitance in FIG. 7C. In addition, the first curvature BOa at this point may be defined as having a value of positive polarity. For example, the first curvature BOa may be defined as having a level of +2.

FIG. 8B illustrates that a second curvature Bob is formed in the second liquid LQ2 according to application of an electrical signal to each of the first electrodes E11, E12, E13, and E14 and the second electrode E2.

Referring to FIG. 8B, it is illustrated that an area of a boundary region Aba is AMb (>AMa) when the second curvature Bob is formed in the second liquid LQ2. In particular, it is illustrated that the area of the boundary region Aba, which is in contact with the first liquid LQ1, of the inclined portion of the first insulating layer 148a on the first-first electrode E11 is AMb.

According to Equation 1, the area of the boundary region Aba in FIG. 8B is larger than that in FIG. 8A, and thus the capacitance of the boundary region Aba becomes larger. Meanwhile, the capacitance in FIG. 8B may be defined as CAba, which is greater than CAaa that is the capacitance in FIG. 8A.

The second curvature BOb at this point may be defined as having a value of positive polarity greater than the first curvature BOa. For example, the second curvature BOb may be defined as having a level of +4.

Meanwhile, according to FIGS. 8A and 8B, the liquid lens unit 140 operates as a convex lens, and accordingly, an output light LP1a formed by converging incident light LP1 is output.

Next, FIG. 8C illustrates that a third curvature BOc is formed in the second liquid LQ2 according to application of an electrical signal to each of the first electrodes E11, E12, E13, and E14 and the second electrode E2.

In particular, in FIG. 8C, it is illustrated that an area of a left boundary region Aca is AMa and an area of a right boundary region Acb is AMb (>AMa).

In particular, it is illustrated that the area of the boundary region Aca, which is in contact with the first liquid LQ1, of the inclined portion of the first insulating layer 148a on the first-first electrode E11 is AMa, and the area of the boundary region Acb, which is in contact with the first liquid LQ1, of the inclined portion of the second insulator 148b on the second electrode E12 is AMb.

Accordingly, the capacitance of the left boundary region Aca may be CAaa, and the capacitance of the right boundary region Acb may be CAba. The third curvature BOc at this point may be defined as having a value of positive polarity. For example, the third curvature BOc may be defined as having a level of +3. Meanwhile, according to FIG. 8C, the liquid lens unit 140 operates as a convex lens, and accordingly, an output light LP1b formed by converging incident light LP1 further to one side may be output.

Next, FIG. 8D illustrates that a fourth curvature BOd is formed in the second liquid LQ2 according to application of an electrical signal to each of the first electrodes E11, E12, E13, and E14 and the second electrode E2.

In FIG. 8D, it is illustrated that an area of a boundary region Ada is AMd (>AM0) when the fourth curvature BOd is formed in the second liquid LQ2. In particular, it is illustrated that the area of the boundary region Ada, which is in contact with the first liquid LQ1, of the inclined portion of the first insulating layer 148a on the first-first electrode E11 is AMd.

According to Equation 1, the area of the boundary region Ada in FIG. 8D is larger than that in FIG. 8C, and thus the capacitance of the boundary region Ada becomes larger. Meanwhile, the capacitance in FIG. 8D may be defined as CAda, which is greater than CAc0 that is the capacitance in FIG. 7C.

The fourth curvature BOd at this point may be defined as having a value of negative polarity. For example, the fourth curvature BOd may be defined as having a level of −2.

Next, FIG. 8E illustrates that a fifth curvature BOe is formed in the second liquid LQ2 according to application of an electrical signal to each of the first electrodes E11, E12, E13, and E14 and the second electrode E2.

In FIG. 8E, it is illustrated that an area of a boundary region Aea is AMe (>AMd) when the fifth curvature BOe is formed in the second liquid LQ2. In particular, it is illustrated that the area of the boundary region Aea, which is in contact with the first liquid LQ1, of the inclined portion of the first insulating layer 148a on the first-first electrode E11 is AMe.

According to Equation 1, the area of the boundary region Aea in FIG. 8E is larger than that in FIG. 8D, and thus the capacitance of the boundary region Aea becomes larger. Meanwhile, the capacitance in FIG. 8E may be defined as CAea, which is greater than CAda that is the capacitance in FIG. 8D. The fifth curvature BOe at this point may be defined as having a value of negative polarity. For example, the fifth curvature BOe may be defined as having a level of −4.

Meanwhile, according to FIGS. 8D and 8E, the liquid lens unit 140 operates as a concave lens, and accordingly, an output light LP1c formed by diverging incident light LP1 is output.

FIG. 9 is a block diagram of an optical device according to the embodiment, FIG. 10 illustrates a modified example of FIG. 9, and FIGS. 11 to 13 are views referenced in the description of FIGS. 9 and 10.

First, a term "unit" used herein includes a software, a field-programmable gate array (FPGA), or a hardware component such as an application-specific integrated circuit (ASIC), and the "unit" performs certain functions. However, the "unit" is not limited to the software or hardware. The "unit" may be configured to reside on an addressable storage medium or may be configured to play one or more processors. Therefore, the "unit" may include, for example, components (such as software components, object-oriented software components, class components, and task components), processes, functions, attributes, procedures, subroutines, segments of program code, drivers, firmware, microcodes, circuitry, data, databases, data structures, tables, arrays, and variables. Components and functions provided in "units" may be combined to be a smaller number of components and "units," or may be further divided into additional components and "units." Furthermore, the components and "units" may be implemented to play back one or more central processing units (CPUs) in a device or a secure multimedia card.

Referring to FIG. 9, an optical device 200 may include a control circuit 210, a lens assembly 220, a gyro sensor 230, a memory unit 290, and a temperature sensor 299. The control circuit 210 may correspond to the control circuit 20, and the lens assembly 220 may correspond to the lens assembly 10, i.e., the lens assembly (110, 120, 130, 140, 162, and 164). In addition, the optical device 200 may further include an image sensor 30 and an image processor 31.

First, the gyro sensor 230 may sense an angular velocity of a liquid lens 280 or the optical device and may also be positioned in a controller 240. That is, the present invention is not limited to such a position. In addition, the gyro sensor 230 may sense an angular velocity (or an angle) of movement in two directions, for example, a yaw-axis direction and a pitch-axis direction, in order to compensate for hand tremor of the optical device in an up-down direction and a left-right direction. The gyro sensor 230 may generate a motion signal having information on the sensed angular velocity and provide the motion signal to the voltage controller 240.

In addition, the image sensor 30 may convert light passing through the liquid lens 280 into an electrical signal. In addition, the image processor 31 may perform image processing on the basis of the electrical signal from the image sensor 30. It should be understood that the image processor 31 may be positioned in the control circuit 210 or the optical device according to the embodiment or an external system (e.g., a terminal).

An external system 40 may be positioned outside the optical device. For example, the external system 40 may be a terminal and may provide the electrical signal to the optical device so that an interface of the liquid lens 280 in the optical device has a desired diopter. In an embodiment, the external system 40 may provide an electrical signal for setting a focus through the image processor 31 to the optical device (e.g., the control circuit 210). The external system 40 may transmit a focus signal, which is a digital code, to the controller 240.

Further, the external system 40 may be positioned on the optical device or the terminal and may further include a controller, a control device, a control unit, an adjusting unit, and the like. In addition, the external system 40 may be connected to the optical device by an inter-integrated circuit ($I^2C$) communication method. However, the present invention is not limited thereto, and the connection may be made by other communication methods other than $I^2C$.

In the liquid lens 280, as a curvature of a liquid or plate varies with temperature, a focal length or diopter may be varied. Thus, a focal length or diopter of the lens assembly may also be changed. The temperature sensor 299 may sense the temperature of the liquid lens 280 or sense the temperature of the lens assembly. Sensing the temperature includes direct or indirect sensing.

In addition, the temperature sensor 299 may include a thermistor or the like. For example, the temperature sensor 299 may include a negative temperature coefficient (NTC) that is inversely proportional to the sensed temperature or a positive temperature coefficient (PTC) that is proportional to the sensed temperature.

Further, the temperature sensor 299 may transmit temperature information including the sensed temperature to the control circuit 210 or the controller 240. When the temperature is increased through the temperature information received from the temperature sensor 299, the control circuit 210 may output a driving signal in consideration of a change of the interface of the liquid lens 280 according to the temperature. The detailed description thereof will be given below. In addition, the temperature information refers to a temperature, and hereafter, the temperature information and the temperature are used interchangeably.

The control circuit 210 may include the controller 240, a lens driving unit 250, and a power supply unit 260 and may control the operation of the lens assembly 220 including the liquid lens 280.

The controller 240 may have a configuration for performing an auto focus (AF) function and an optical image stabilization (OIS) function. The controller 240 may control the liquid lens 280 included in the lens assembly 220 using a user request or a sensed result (e.g., a sensing signal of the gyro sensor 230). Here, the liquid lens 280 may correspond to the liquid lens unit described above.

The controller 240 may calculate a driving voltage corresponding to a shape that the liquid lens 280 needs to have. Specifically, the controller 240 may receive information (i.e., information on a distance to an object) for the AF function from the optical device, the internal component of the optical device 200 (e.g., the image sensor 30), or the external system 40 (e.g., including a distance sensor or an application processor), and may calculate the driving voltage corresponding to the desired shape of the liquid lens 280 on the basis of a focal length, which is for focusing on the object, through the distance information.

In addition, the controller 240 may obtain a driving voltage code corresponding to the calculated driving voltage by referring to a driving voltage table and output the obtained driving voltage code to the lens assembly 220 (e.g., a driving voltage providing unit (not shown)). In this case, the controller 240 may have a driving voltage table in which the driving voltage code is mapped to generate the driving voltage. Alternatively, the controller 240 may further include a driving voltage unit (not shown) configured to generate the driving voltage, and the driving voltage unit may be positioned in the liquid lens module or in the optical device.

In addition, in the present specification, the information for the AF function is described as "focus information," and the driving voltage code corresponding to the driving voltage to which the focus information is applied is described as a "focus signal." That is, the driving voltage code corresponding to the driving voltage to which the focus information is reflected by the controller 240 is the focus signal, and the driving voltage code corresponding to the driving voltage to which both the focus information and the temperature information are reflected is the driving signal.

In addition, the lens driving unit may be driven by the focus signal or the driving signal, and the focus signal is a signal in which a change of the interface of the liquid lens according to the temperature is not compensated for, and the driving signal is a signal in which the change of the interface of the liquid lens according to the temperature is compensated for. Thus, the optical device according to the embodiment may perform an accurate AF function even when the temperature is changed since the interface of the liquid lens is changed by the focus signal and the driving signal to which the temperature information is reflected.

Alternatively, the controller 240 may generate an analog-type driving voltage corresponding to a provided digital-type driving voltage code on the basis of the digital-type driving voltage code and may provide the analog-type driving voltage to the lens assembly 220. Thus, the position of the driving voltage providing unit may be changed.

Further, in an embodiment, the controller 240 may output a driving signal, which is a voltage code in a data form (e.g., digital), and may apply the driving signal in an analog form to the liquid lens 280 through pulse-width modulation (PWM) control. Accordingly, finally, the controller 240 may control the curvature of the liquid lens 280.

The controller 240 may control the interface by applying a driving signal to the liquid lens 280 using the focus information, which is received through image processing, and the temperature information from the temperature sensor.

The lens driving unit 250 may selectively provide a voltage level supplied from the power supply unit 260, which will be described below, to each terminal of the liquid lens 280. In an embodiment, the lens driving unit 250 may include a switching unit. Here, the switching unit may include a circuit component called an H-bridge.

In addition, a high voltage output from a voltage booster may be applied as a power supply voltage of the switching unit. Accordingly, the switching unit may selectively supply the applied power supply voltage and a ground voltage to both ends of the liquid lens 280.

Further, the liquid lens 280 includes four first electrodes including four electrode sectors for driving, a first connection substrate, one second electrode, and a second connection substrate. Both ends of the liquid lens 280 may be any one of the plurality of first electrodes and the second electrode. In addition, both ends of the liquid lens 280 may be one of the four electrode sectors of the four first electrodes and one electrode sector of the second electrode.

Accordingly, a pulse-type voltage having a predetermined width may be applied to each electrode sector of the liquid lens 280. In addition, the voltage may be a difference between voltages applied to the first and second electrodes and may be applied to the liquid lens 280.

The power supply unit 260 may apply a separate power to the lens driving unit 250. The power supply unit 260 may include the voltage booster that increases a voltage level. In addition, the lens driving unit 250 may selectively output the increased voltage to each terminal of the liquid lens 280.

As described above, the controller 240 may control a phase of the driving signal supplied to the lens driving unit 250, that is, a phase of a pulse voltage applied to the common electrode and the individual electrode so that the lens driving unit 250 may generate an analog-type driving voltage corresponding to the driving voltage. In other words, the controller 240 may control a voltage applied to each of the first electrode and the second electrode. Hereinafter, a description will be made on the basis of a driving signal in the form of voltage.

In addition, the control circuit 210 may further include a connector (not shown) that performs a communication or interface function of the control circuit 210. For example, the connector may perform communication protocol conversion for communication between the control circuit 210, which uses an $I^2C$ communication method, and the lens assembly 220, which uses a mobile industry processor interface (MIPI) communication method. In addition, the connector may receive power from an external device (e.g., a battery) and supply power required for the operation of each of the controller 240 and the lens assembly 220. In this case, the connector may correspond to the connector 153 shown in FIG. 2.

Further, the memory unit 290 may be positioned in the control circuit 210 or may be positioned apart from the control circuit 210. The memory unit 290 may store temperature information for each diopter, delay information, information on a delay that is a time difference between a plurality of pulses (voltage signals) applied to the liquid lens 280, gain information, and offset information. For example, the memory unit 290 may store temperature information for a specific diopter (e.g., a 0 diopter), delay information, information on a delay that is a time difference between a plurality of pulses (voltage signals) applied to the liquid lens 280, gain information, and offset information.

In addition, as described above, in order to form a target curvature, the control circuit 210 may output a voltage signal, which is changed on the basis of the sensed temperature, to the liquid lens 280 from the lens driving unit 250. In addition, the control circuit 210 may vary a delay, which is a time difference of a plurality of pulses applied to the liquid lens 280, according to the sensed temperature.

Further, since the control circuit 210 outputs the driving signal to which the sensed temperature is reflected, the driving signal may be different depending on the temperature even when the same diopter is provided. The delay, which is a time difference of a plurality of pulses applied to the liquid lens 280, may vary depending on different driving signals. As a result, the curvature of the lens may be quickly and accurately varied using the sensed temperature information.

The control circuit 210 may vary the curvature of the lens quickly and accurately using the sensed temperature information by varying the delay, which is a time difference of a plurality of pulses applied to the liquid lens 280, according to the information stored in the memory unit 290 and the sensed temperature.

Referring to FIG. 10, a timing diagram for the common electrode E2, an individual electrode E1, and a switching element SWL in the optical device is illustrated.

Specifically, during a period Dt1 between T1 and T3, the switching element SWL is turned on. In addition, it is illustrated that, for the accuracy and stability of sensing in the temperature sensor 299, a pulse is applied to one of the common electrode E2 and a plurality of individual electrodes E1 in the liquid lens 280 during the period Dt1 between T1 and T3.

In an embodiment, a pulse having a pulse width of Dt2 may be applied to the common electrode E2 at a time point of T2. Accordingly, a curvature may be formed in the liquid lens 280 after the time point of T2.

In addition, a pulse having a pulse width of Dt3 may be applied to the individual electrode E1 at a time point of T4. That is, a high-level voltage may be applied to the common electrode E2 at the time point of T2, and a high-level voltage may be applied to the individual electrode E1 at the time point of T4.

Accordingly, the curvature in the liquid lens 280 may be varied due to a time difference DFF1 between the pulse applied to the common electrode E2 and the pulse applied to the individual electrode E1.

For example, as the time difference Dff1 between the pulses increases, an area of a boundary region increases. In other words, the curvature may increase.

In addition, it is possible to maintain or change the curvature in the liquid lens 280 by varying a time difference DFF2 between the pulses after the time difference DFF1 between the pulses.

FIGS. 11 to 13 are diagrams for describing relationships between a focus signal, a temperature, a diopter, and a delay for describing the operation of the controller according to the embodiment.

First, referring to FIG. 11, when the focus signal increases, a time difference (or a delay) between the pulses increases accordingly. In addition, when the focus signal increases and the delay increases, the curvature of the liquid lens may be changed as described above. Further, the capacitance of the liquid lens may increase. Like the focus signal, the delay may also increase when the driving signal increase.

In addition, the optical device according to the embodiment may calculate a diopter corresponding to the focus signal from the focus signal received from the external system. The diopter corresponding to the received focus signal will be described below as a set diopter.

In other words, the optical device may calculate a diopter (here, the set diopter) required in the external system from the focus signal. However, as described above, since the interface of the liquid lens is changed according to the temperature, in order to accurately provide the desired diopter (set diopter), the driving signal may be calculated by reflecting the temperature information sensed by the temperature sensor. That is, through the driving signal to which the temperature information is reflected, the liquid lens may provide the set diopter required by the external system. Here, like the driving signal, the focus signal may correspond to the driving voltage (or the driving voltage code corresponding to the driving voltage).

Referring to FIGS. 12 and 13, a driving signal according to the temperature for the diopter is depicted. The driving signal may vary according to a change in diopter. In addition, for the same diopter Dsm, the driving signal may have different values according to the temperature. For example, for the same diopter, the driving signal may correspond to a different driving voltage code according to the temperature. For example, for the diopter Dsm, the driving signal is DS1 at 25° C. and DS2 at 45° C. In other words, when the temperature is 25° C., the diopter of Dsm may be implemented by setting the delay, which is a time difference between a first pulse and a second pulse, to DD1 by the driving signal of DS1, but, when the temperature is 45° C., by setting the delay to DD1, the liquid lens provides a diopter less than Dsm.

Accordingly, the controller may vary the driving signal or the delay of a plurality of pulses applied to the liquid lens to output the desired set diopter (here, "Dsm") to correspond to the sensed temperature.

Further, the controller may increase or decrease the driving signal according to the sensed temperature and a reference temperature for the set diopter. In an embodiment, the controller may increase the delay applied to the liquid lens when the sensed temperature is 45° C. and the reference temperature for the set diopter is 25° C. In contrast, when the sensed temperature is 25° C. and the reference temperature for the set diopter is 45° C., the controller may decrease the delay applied to the liquid lens. With such a configuration, even when the temperature is varied, the desired diopter may be accurately maintained. In addition, unlike the case in which the temperature compensation is performed by recognizing information on the curvature or the desired curvature of the liquid lens from the capacitance, inaccuracy, which may occur due to a decrease rate of the capacitance and a change in capacitance according to temperature, may be blocked. In other words, the optical device according to the embodiment does not measure the change of the interface of the liquid lens by using the capacitance, so that the inaccuracy of the capacitance measurement caused by the temperature change or the like can be easily removed.

Further, here, the reference temperature may be a temperature corresponding to the focus signal. For example, the optical device and the external system may mutually set 20° C. as the reference temperature. In addition, the memory unit may store the driving signal (driving voltage code, from RD1 to RDN) according to the diopter (from a 0 diopter to an N diopter) for 20° C. that is the reference temperature. Accordingly, when the driving voltage code of the focus signal is applied with RD1, the controller may calculate that the set diopter is the 0 diopter, and when the driving voltage code of the focus signal is applied with RDN, the controller may calculate that the set diopter is the N diopter.

In particular, the optical device according to the embodiment may easily calculate a driving function for all the temperatures and diopters with only a function (hereinafter, first and second driving functions) of a driving voltage code (hereinafter, described to as a driving signal) according the temperature for two diopters (first and second diopter). With such a configuration, the entire focus signal according to the temperature may not be stored so that a computation speed and data space may be easily secured. A detailed description of these operations will be described in detail with reference to FIGS. 14 to 19.

Further, it can be seen that, since the driving voltage code is changed according to the temperature, the diopter corresponding thereto is changed. It can be seen that the diopter increases when the temperature increases, and in contrast, the diopter decreases when the temperature decreases. For example, when the temperature increases, in order to maintain the set diopter corresponding to the focus signal, the optical device may decrease the driving signal to correspond to the temperature.

FIG. 14 is a diagram for describing a driving signal graph according to temperature calculated by the controller according to the embodiment, and FIG. 15 is a diagram for describing a relationship between a second section and a third section in FIG. 14.

Referring to FIG. 14, the memory unit may store a first driving function composed of a plurality of first driving signals according to temperature for a first diopter and a second driving function composed of a plurality of second driving signals according to temperature for a second diopter. The first diopter and the second diopter may be a minimum diopter and a maximum diopter, respectively, which may be provided by the liquid lens.

Further, in the memory unit, the first driving function and the second driving function may include different functions depending on a predetermined temperature range. For example, the first driving function may include a first function in a first temperature range and may include a second function in a second temperature range. In other words, the controller may apply a different function depending on the sensed temperature received from the temperature sensor to a particular driving function (e.g., a driving function for the first diopter). In addition, all of the functions in each temperature range may be stored in the memory unit.

In addition, in an embodiment, the controller may control the driving signal using the first function when the sensed temperature is in the first temperature range and control the driving signal using the second function different from the first function when the sensed temperature is in the second temperature range.

The controller according to the embodiment may calculate the set diopter from the focus signal, and calculate the driving signal, which provides the set diopter, using the first driving function, the second driving function, and the temperature information. Accordingly, a driving voltage corresponding to the calculated driving signal is applied to the liquid lens so that the liquid lens may have the set diopter.

Specifically, the first driving function and the second driving function may include a first range, a second range, and the like calculated using any first and second points. Referring to the drawing, description is provided with reference to the first driving function, and the description of the first driving function may be equally applied to the second driving function.

As described above, a first driving function FF1 may be composed of a plurality of driving signals (interchangeably used with a first driving signal) according to the temperature for a predetermined diopter (hereinafter, a first diopter). The first driving function FF1 may include the driving signals according to the temperature for the first diopter. For example, the first driving function FF1 may include different driving signals at 1.1° C., 1.2° C., and 1.3° C. at which the liquid lens has the first diopter. In particular, the first driving function FF1 may be composed of a relationship or configuration described below.

The first driving function FF1 may be composed of a relational expression for the temperature for a particular diopter, that is, the first diopter. The first driving function FF1 may include a first range R1 between any first point RP1 and any second point RP2. Here, each of the first point RP1 and the second point RP2 may correspond to coordinates of the driving signal corresponding to the temperature. That is, the first point RP1 may be composed of a temperature t1 and a driving signal c1, and the second point RP2 may be composed of a temperature t2 and a driving signal c2. In an embodiment, the first range R1 may be composed of a linear function between the first point RP1 and the second point RP2. In an embodiment, the function of the driving signal for the temperature in the first range R1 may be the first function described above. In addition, the first function may be applied in the first range R1. In addition, the first function may have a first slope that is a slope of the linear function. The first range may be interchangeably used with the first temperature range, and the range to be described below is divided on the basis of the temperature.

The temperature in the first driving function may range from −20° C. to 70° C. This may be set within a temperature range in which the liquid lens operates in the optical device. In an embodiment, the first temperature range may range from 20° C. to 70° C. In other words, when the sensed temperature is in a range of 20° C. to 70° C., the controller may control the driving signal by applying the first function. In addition, the first point RP1 may have a higher temperature and a smaller driving signal than the second point RP2.

The first driving function FF1 may further include a third range R3 spaced apart from the first range R1 and a second range R2 disposed between the third range R3 and the first range R1. The second range R2 and the third range R3 may be calculated using a third point RP3.

In an embodiment, when the sensed temperature is present in the second range R2 or the third range R3, the controller may apply the second function to control the driving signal. That is, the controller determines that the second range R2 is the second temperature range and applies the temperature to the second function to control the driving signal. The second function may have a higher degree than the first function described above. In other words, the first function may have a lower degree than the second function. In an embodiment, the second function may be a quadratic function, and the first function may be a linear function. Accordingly, the second function may have a second slope that changes according to temperature. For example, the second slope may decrease from the second point RP2 toward the third point RP3.

In this way, according to the embodiment, since the first slope of the first function is the same in the first temperature range, the amount of change in accordance with the temperature of the driving signal may be constant. Alternatively, since the second slope of the second function changes in the second temperature range, the amount of change in accordance with the temperature of the driving signal may be changed. This is because the curvature of the liquid lens is varied according to the temperature and a variation of the curvature is also different according to the temperature. That is, the controller according to the embodiment may compensate for a change in variation of the curvature according to the temperature, thereby performing more accurate temperature compensation. In addition, the optical device according to the embodiment may use the first driving function and the second driving function to which the characteristics of the liquid lens are reflected, thereby providing a fast processing speed as well as calculating the driving signal to have an accurate diopter or focal distance. In addition, the second slope may be less than the first slope. That is, since the first temperature range represents most of the temperature of the actual optical device, a change in temperature in the first temperature range may be compensated for more precisely.

In an embodiment, the second function in the second range (the second temperature range) may be formed as a quadratic function using the first point RP1, the second point RP2, and the third point RP3. That is, the relationship between the temperature and the driving function in the second range R2 may be represented as a quadratic function. In addition, the second range R2 may be positioned between the second point RP2 and the third point RP3. In addition, the third range R3 may be a range having a lower temperature than the third point RP3.

The temperature in the first range R1 may be greater than the temperature in each of the second range R2 and the third range R3. In addition, the temperature in the second range R2 may be greater than the temperature in the third range R3. Accordingly, in an embodiment, the temperature in the first temperature range may be higher than that in the second temperature range. In addition, the driving signal in the first temperature range may be smaller than the driving signal in the second temperature range. For example, the minimum value of the driving signal in the first temperature range may be greater than the maximum value of the driving signal in the second temperature range.

In addition, the third point RP3 may be a critical point of the first driving function or a critical point of the second driving function. In other words, the temperature at the third point RP3 may be a temperature at the maximum or minimum driving signal calculated with the second function. That is, the temperature at the third point RP2 may be a boundary point between the second temperature range and the third temperature range. The increase or decrease in the magnitude of the driving signal according to temperature may be changed according to the setting. In the present specification, it should be understood that the voltage applied to the electrode of the liquid lens increases as the driving signal increases.

Further, the third point RP3 may be a point at which the sign of the slope changes in the range having a lower temperature than the second point RP2. For example, the third point RP3 may be a point at which the slope changes from negative to positive. In an embodiment, the third point RP3 may be positioned at a point less than or equal to 0° C. In addition, at points below the third point RP3, a change in the curvature of the liquid lens according to the change in temperature is small, and the liquid lens may be difficult to be driven in the third range R3.

In addition, the controller may control the driving signal according to the third function at a temperature below the third point RP3, that is, in the third range R3 (i.e., corresponding to the third temperature range). In an embodiment, the third function may be a quadratic function or a constant.

Referring to FIG. 15, the optical device according to the embodiment may similarly apply a weight for the slope in the second range R2 to the third range R3. That is, the second range R2 and the third range R3 may have symmetrical slopes with respect to the third point RP3 in the first driving function. In other words, the second slope of the second range R2 and a third slope of the third range R3 may be different only in negative/positive signs. Accordingly, the third function may be a quadratic function that is the same function as the second function. With such a configuration, temperature compensation in the third range R3 may be quickly performed.

In addition, as a modified example, the third function may be a constant. Accordingly, the controller may more easily control the driving function in the third temperature range. This reflects the actual temperature environment of the optical device, for example, a temperature environment in which the optical device is difficult to use, and the processing speed of the controller can be improved by minimizing processing at a temperature in which the optical device is difficult to use.

In addition, the above-described first diopter and second diopter may be different. The first diopter and the second diopter may be values corresponding to an affinity and a macro, respectively. In other words, as described above, the first driving function of the first diopter and the second driving function of the second diopter may be functions of driving signals for a minimum focal length or a maximum focal length.

Further, the set diopter may be the same as the first diopter or the second diopter and may be different from the first diopter and the second diopter.

FIGS. 16 to 19 are diagrams for describing the driving of the controller according to the embodiment.

First, the controller according to the embodiment may calculate a driving signal by compensating for a focus signal corresponding to focus information with temperature information. Hereinafter, the calculation of the driving signal will be described in detail. Referring to FIG. 16, the controller according to the embodiment may generate a first driving function FF1 and a second driving function FF2 from a plurality of first driving signals SG3$a$ and SG3$b$ and a plurality of second driving signals SG4$a$ and SG4$b$ in the memory unit. The contents described with reference to FIGS. 14 and 15 may be similarly applied to the description of this. In addition, in the following description, "a," "b," "d," "e," "x," "y," "h," "i," and "f" may be driving signals (or driving voltage codes).

The first driving signals SG3$a$ and SG3$b$ are driving signals at different temperatures K1 and K2 for a first diopter D1, and the first driving function FF1 is a function of the driving signal according to temperature for the first diopter D1.

Further, the second driving signals SG4$a$ and SG4$b$ are driving signals at different temperatures K1 and K2 for a second diopter D2, and the second driving function FF2 is a function of the driving signal according to temperature for the second diopter D2. In this case, the temperature corresponding to the first driving signals SG3$a$ and SG3$b$ and the temperature corresponding to the second driving signals SG4$a$ and SG4$b$ may be different, or at least some thereof may be the same.

Further, it should be understood that, in the first driving function FF1 and the second driving function FF2, the driving signal is controlled with the first function or the second function according to the first temperature range and the second temperature range, respectively, as described above. Furthermore, it should be understood that, in the first driving function FF1 and the second driving function FF2, the driving signal is controlled with the third function in the third temperature range. Referring to FIGS. 17 and 18, the controller may calculate a driving signal P1 using the second driving function FF2. As an example, the driving signal P1 may be positioned on the second driving function FF2, and the second driving function FF2 may be calculated as a function for the second driving signals SG4$a$ and SG4$b$, as described above. That is, when a set diopter calculated from a focus signal is the same as the second diopter D2, the controller may calculate the driving signal P1 corresponding to a temperature (see FIG. 17, a temperature lower than K) sensed by the temperature sensor. Accordingly, in the liquid lens, the interface may operate with the second diopter D2 at the corresponding temperature (the temperature lower than K1).

In addition, the controller may calculate a plurality of third driving functions FF3 according to temperature from the first driving function FF1 and the second driving function FF2.

In an embodiment, when the first driving signals SG3a and SG3b and the second driving signals SG4a and SG4b are driving signals for the same temperature as shown in FIG. 16, the controller may calculate the third driving function using the first driving signal and the second driving signal.

That is, the controller may calculate the third driving function using first driving signals a and b and first and second diopter D1 and D2, and second driving signals d and e and the first and second diopter D1 and D2. For example, the controller may calculate the third driving function of the driving signal for each diopter at a specific temperature K1 using the first driving signals a and b and the diopters (the first diopter D1 and the second diopter D2).

In an embodiment, the controller may calculate a driving signal P2 using the third driving function. As an example, the driving signal P2 may be positioned on the third driving function. In this case, the controller may calculate and output the driving signal P2 corresponding to the calculated set diopter and the temperature (see FIG. 17, K1) sensed by the temperature sensor. Accordingly, in the liquid lens, the interface may operate with a fourth diopter D4.

Referring to FIG. 18, the third driving function may be calculated using a driving signal at a specific temperature calculated from the first driving function FF1 and a driving signal at a specific temperature calculated from the second driving function FF2.

That is, the controller may calculate a driving signal x for the first diopter D1 from the first driving function FF1 at a temperature K3, and calculate a driving signal y for the second diopter D2 from the second driving function FF2 at a temperature K3.

In addition, the controller may calculate the third driving function as a linear function of the driving signal for the set diopter at the sensed temperature K3 by using the driving signals x and y and the diopters (the first diopter D1 and the second diopter D2). With such a method, the controller may calculate the plurality of third driving functions according to temperature. In addition, as described above, the plurality of third driving functions may be functions of the driving signal for the diopters at various temperatures. In addition, the controller may calculate and output the driving signal by applying the set diopter and the temperature to the third driving function so that the liquid lens has the set diopter.

Referring to FIG. 19, the controller may calculate driving signals h, i, f, and g or d, I, g, and e for a fourth diopter D4 and a fifth diopter D5 through a plurality of third driving functions.

The controller may calculate the driving signals h, i, f, and g or d, I, g, and e through the third driving function, and calculate fourth driving functions FF4a and FF4b as functions of the driving signal according to temperature for the same diopter (the fourth diopter D4 or the fifth diopter D5) using the calculated driving signals h, i, f, and g or d, I, g, and e.

Accordingly, the controller may calculate the driving signal for the fifth diopter D5 at K3 as a driving signal P3 by using the driving signals h, i, f, and g and the diopters (fourth diopter D4 and the fifth diopter D5).

The invention claimed is:

1. An optical device comprising:
a lens assembly that includes a liquid lens including a first liquid and a second liquid forming an interface therebetween;
a temperature sensor configured to sense a temperature of the liquid lens; and
a controller configured to control a driving signal of the liquid lens,
wherein the controller is configured to:
control the driving signal using a first function when the sensed temperature is in a first temperature range;
control the driving signal using a second function different from the first function when the sensed temperature is in a second temperature range;
control the driving signal using a third function in a third temperature range lower than the second temperature range;
calculate a first driving function composed of a plurality of first driving signals according to the temperature for a first diopter; and
calculate a second driving function composed of a plurality of second driving signals according to the temperature for a second diopter different from the first diopter,
wherein the first driving function includes the first function, the second function and the third function, and
wherein a temperature at a boundary between the second temperature range and the third temperature range is a temperature when a value calculated with the second function is a maximum value.

2. The optical device of claim 1, wherein the first function is a function whose degree is lower than the second function.

3. The optical device of claim 2, wherein:
the first function is a linear function; and
the second function is a quadratic function.

4. The optical device of claim 1, wherein:
the first temperature range is a range having a higher temperature than the second temperature range; and
a value of the driving signal in the first temperature range is smaller than a value of the driving signal in the second temperature range.

5. The optical device of claim 1, comprising a memory unit configured to store the first function and the second function,
wherein the first function and the second function are functions of the driving signal according to the temperature when the lens assembly has a first diopter.

6. The optical device of claim 1, wherein:
a variation of the driving signal is constant according to temperature in the first temperature range; and
the variation of the driving signal is changed according to temperature in the second temperature range.

7. The optical device of claim 1, wherein the third function of the third temperature range is a quadratic function or a constant.

8. The optical device of claim 7, wherein the third function is a function identical to the second function.

9. The optical device of claim 1, wherein the temperature of the liquid lens is a temperature measured in the liquid lens or the lens assembly.

* * * * *